United States Patent
Yamamoto et al.

(10) Patent No.: US 6,467,026 B2
(45) Date of Patent: Oct. 15, 2002

(54) WEB CACHE MEMORY DEVICE AND BROWSER APPARATUS UTILIZING THE SAME

(75) Inventors: Kazumichi Yamamoto, Cupertino; Yukio Umetani, Hamamatsu; Norihiro Suzuki, Cupertino; Muneaki Yamaguchi, Campbell, all of CA (US)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/989,134

(22) Filed: Nov. 21, 2001

(65) Prior Publication Data

US 2002/0032839 A1 Mar. 14, 2002

Related U.S. Application Data

(63) Continuation of application No. 09/308,618, filed as application No. PCT/JP96/03448 on Nov. 25, 1996, now abandoned.

(51) Int. Cl.[7] ............................................... G06F 12/02
(52) U.S. Cl. ...................... 711/118; 711/104; 711/112; 711/115; 711/202; 711/205; 711/207
(58) Field of Search ............................ 711/3, 115, 118, 711/104, 112, 202, 205–207

(56) References Cited

U.S. PATENT DOCUMENTS

| | | | |
|---|---|---|---|
| 5,151,989 A | 9/1992 | Johnson et al. | 707/10 |
| 5,485,439 A | 1/1996 | Hamasaka et al. | 369/47 |
| 5,727,129 A | 3/1998 | Barrett et al. | 706/10 |
| 5,946,697 A | 8/1999 | Shen | 707/104 |
| 6,006,268 A | 12/1999 | Colie et al. | 709/227 |
| 6,119,153 A | 9/2000 | Dujari et al. | 709/218 |
| 6,182,193 B1 | 1/2001 | Hamami | 711/119 |

FOREIGN PATENT DOCUMENTS

| | | |
|---|---|---|
| JP | 0626355 | 1/1987 |
| JP | 2118777 | 5/1990 |
| JP | 226069 | 10/1990 |
| JP | 42005414 | 7/1992 |
| JP | 887526 | 4/1996 |
| JP | 8278967 | 10/1996 |
| JP | 63201743 | 8/1998 |

OTHER PUBLICATIONS

Nikkei Electronics, No. 670 (Tokyo), Sep. 9, 1996, "An Update Technology of Reloadable DVD", pp. 113–119.
Technical Disclosure Bulletin No. 93–29598, Oct. 15, 1993.
Technical Disclosure Bulletin No. 95–6717, May 1,1995.
IPSJ Research Report, vol. 96, No. 95, Jul. 1996, K. Chinen et al, "Lookahead Target Decision Strategy in WWW Lookahead Deputy Server", pp. 55–60.
Technical Disclosure Bulletin No. 95–6717, May 1, 1995.

*Primary Examiner*—Than Nguyen
(74) *Attorney, Agent, or Firm*—Antonelli, Terry, Stout & Kraus, LLP

(57) ABSTRACT

The present invention relates to a cache mechanism of a browser apparatus as a World Wide Web (WWW) client and aims at the improvement of utilization efficiency and the shortening of an information acquisition delay time. A cache is constituted in an HDD or DVD-RAM under the control of a Web cache program. A copy of acquired information is stored in the cache. A directory of the cache is managed by a Web cache management table, and the control is made so that the writing of the cache contents and necessary entries of the management table is completed before the DVD-RAM is removed from the browser apparatus. A browsing work can be continued smoothly by loading the DVD-RAM to another browser apparatus. Also, if an information provider provides information in a form stored in a disk in the form of a Web cache, the browsing of the information becomes possible with the same URL as that in WWW access.

11 Claims, 18 Drawing Sheets

15 WEB CACHE MANAGEMENT TABLE

| 101 # | 102 URL | 103 FILE ATTRIBUTE | 16 INFORMATION CONCERNING WEB CACHE ON MAIN MEMORY | 17 INFORMATION CONCERNING WEB CACHE ON HDD | 18 INFORMATION CONCERNING WEB CACHE ON DVD-RAM |
|---|---|---|---|---|---|
| 1 | http://www.aaa.co.jp/index.html | --- --- | --- --- | --- --- | --- --- |
| 2 | http://www.bbb.co.jp/sound.au | --- --- | --- --- | --- --- | --- --- |
| 3 | http://ww.ccc.com/movie.m.o.v | --- --- | --- --- | --- --- | --- --- |
| 4 | http://www.ddd.a.c.jp/content.htm | --- --- | --- --- | --- --- | --- --- |
| 5 | http://www.eee.co.jp/clip.avi | --- --- | --- --- | --- --- | --- --- |
| 6 | | | | | |
| 7 | | | | | |

FIG. 6

15 WEB CACHE MANAGEMENT TABLE

| # | URL | FILE ATTRIBUTE | INFORMATION CONCERNING WEB CACHE ON MAIN MEMORY | INFORMATION CONCERNING WEB CACHE ON HDD | INFORMATION CONCERNING WEB CACHE ON DVD-RAM |
|---|---|---|---|---|---|
| 101 | 102 | 103 | 16 | 17 | 18 |
| 1 | http://www.aaa.co.jp/index.html | ... | ... | ... | ... |
| 2 | http://www.bbb.co.jp/sound.au | ... | ... | ... | ... |
| 3 | http://ww.ccc.com/movie.m.o.v | ... | ... | ... | ... |
| 4 | http://www.ddd.a.c.jp/content.htm | ... | ... | ... | ... |
| 5 | http://www.eee.co.jp/clip.avi | ... | ... | ... | ... |
| 6 | | | | | |
| 7 | | | | | |

FIG. 7

15 WEB CACHE MANAGEMENT TABLE

| # | URL | FILE ATTRIBUTE | | INFORMATION CONCERNING WEB CACHE ON MAIN MEMORY | | | | |
|---|---|---|---|---|---|---|---|---|
| | | FILE SIZE | FILE NAME | ORIGINAL PRODUCTION DATE/TIOM | CHECK DATE/TIME | | | |
| 1 | http://ww | 100KB | fid 1 | 1996.9.30 12:00:00 | 1996.10.1 10:00:00 | --- | --- | |
| 2 | http://ww | 1MB | NONE | --- | --- | --- | --- | |
| 3 | http://ww | 5.5MB | NONE | --- | --- | --- | --- | |
| 4 | http://ww | 250KB | fid 2 | 1996.9.25 12:00:00 | 1996.10.1 9:59:00 | --- | --- | |
| 5 | http://ww | 10MB | NONE | --- | --- | --- | --- | |
| 6 | | | | | | | | |
| 7 | | | | | | | | |

15 WEB CACHE MANAGEMENT TABLE

| # | URL | FILE ATTRIBUTE | | | INFORMAITON CONCERNING WEB CACHE ON HDD | | | |
|---|---|---|---|---|---|---|---|---|
| | | FILE SIZE | | ... | FILE NAME | ORIGINAL PRODUCTION DATE/TIME | CHECK DATE/TIME | WRITE-BACK |
| 1 | http://ww/ | 100KB | | ... | fid 1 | 1996.9.10 12:00:00 | 1996.9.20 10:00:00 | ... |
| 2 | http://ww/ | 1MB | | ... | fid 2 | 1996.9.20 12:00:00 | 1996.9.30 16:00:00 | ... |
| 3 | http://ww/ | 5.5MB | | ... | NONE | — | — | ... |
| 4 | http://ww/ | 250KB | | ... | fid 3 | 1996.9.25 12:00:00 | 1996.9.27 10:00:00 | ... |
| 5 | http://ww/ | 10MB | | ... | NONE | — | — | ... |
| 6 | | | | | | | | |
| 7 | | | | | | | | |

FIG. 9

15 WEB CACHE MANAGEMENT TABLE

| # | URL | FILE ATTRIBUTE | | | | INFORMAITON CONCERNING WEB CACHE ON DVD-RAM | | |
|---|---|---|---|---|---|---|---|---|
| | | FILE SIZE | | | | FILE NAME | ORIGINAL PRODUCTION DATE/TIME | CHECK DATE/TIME |
| 1 | http://ww | 100KB | --- | --- | --- | fid 1 | 1996.9.10 12:00:00 | 1996.9.20 10:00:00 |
| 2 | http://ww | 1MB | --- | --- | --- | fid 2 | 1996.9.15 12:00:00 | 1996.9.17 10:00:00 |
| 3 | http://ww | 5.5MB | --- | --- | --- | fid 3 | 1996.9.1 12:00:00 | 1996.9.15 10:00:00 |
| 4 | http://ww | 250KB | --- | --- | --- | NONE | --- | --- |
| 5 | http://ww | 10MB | | | | title 1 | 1996.8.1 12:00:00 | --- |
| 6 | | | | | | | | |
| 7 | | | | | | | | |

_21_ WEB CACHE MANAGEMENT TABLE ON HDD

| 114 | 115 | 116 FILE ATTRIBUTE | | 117 INFORMAITON CONCERNING WEB CACHE ON HDD | | 120 |
|---|---|---|---|---|---|---|
| # | URL | | | 118 | 119 | |
| | | FILE SIZE | | FILE NAME | ORIGINAL PRODUCTION DATE/TIME | CHECK DATE/TIME |
| 1 | http://ww | 100KB | | fid 1 | 1996.9.30 12:00:00 | 1996.10.1 10:00:00 |
| 2 | http://ww | 1MB | | fid 2 | 1996.9.20 12:00:00 | 1996.9.30 16:00:00 |
| 3 | http://ww | 250MB | | fid 3 | 1996.9.25 12:00:00 | 1996.10.1  9:59:00 |
| 4 | | | | | | |
| 5 | | | | | | |

FIG. 11

19 WEB CACHE MANAGEMENT TABLE ON DVD-RAM

| # | FILE ATTRIBUTE | | INFORMATION CONCERNING WEB CACHE ON DVD-RAM | | |
|---|---|---|---|---|---|
| | URL | FILE SIZE | FILE NAME | ORIGINAL PRODUCTION DATE/TIME | CHECK DATE/TIME |
| 1 | http://ww | 100KB | fid 1 | 1996.9.30 12:00:00 | 1996.10.1 10:00:00 |
| 2 | http://ww | 1MB | fid 2 | 1996.9.20 12:00:00 | 1996.9.30 16:00:00 |
| 3 | http://ww | 5.5MB | fid 3 | 1996.9.1 12:00:00 | 1996.10.1 10:01:00 |
| 4 | http://ww | 250KB | fid 4 | 1996.9.25 12:00:00 | 1996.10.1 9:59:00 |
| 5 | http://ww | 10MB | title 1 | 1996.8.1 12:00:00 | 1996.10.1 10:02:00 |
| 6 | | | | | |
| 7 | | | | | |

FIG. 12

14 PRE-READ LIST

| # | URL | DESTINATION OF STORAGE | STORAGE DESTINA-TION FILE NAME | CHECK DATE/TIME |
|---|---|---|---|---|
| 1 | http://www.abc.com./music.au | HD | fid 10 | 1996.10.1 10:05:00 |
| 2 | | | | |

128  129  130  131  132

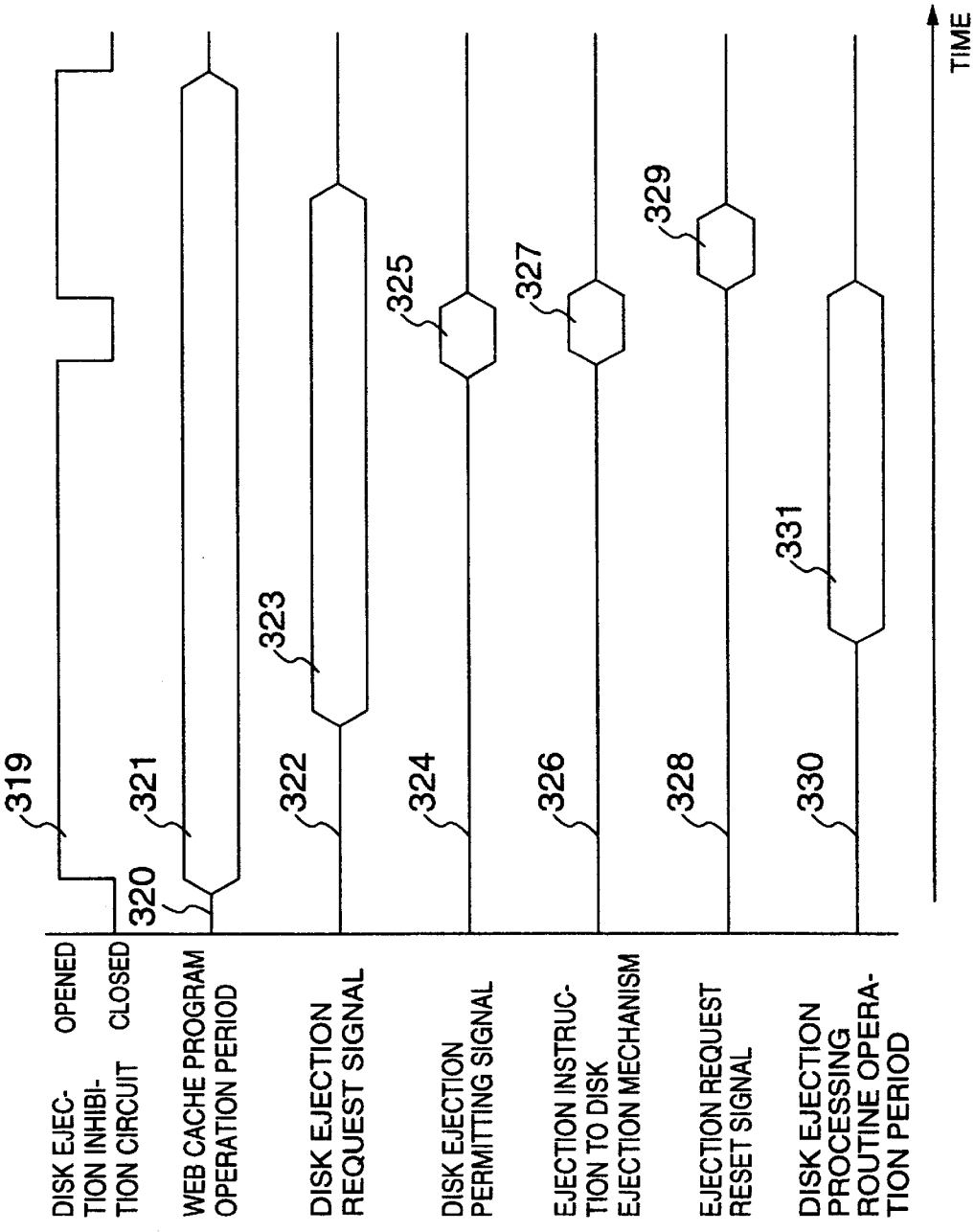

US 6,467,026 B2

WEB CACHE MEMORY DEVICE AND BROWSER APPARATUS UTILIZING THE SAME

This is a continuation of application Ser. No. 09/308,618, filed Jul. 23, 1999, now abandoned which is based on PCT/JP96/03448 filed Nov. 25, 1996.

TECHNICAL FIELD

The present invention relates to a client system such as a browser apparatus, a personal computer or the like which receives a World Wide Web (WWW) service. More particularly, the present invention relates to a cache mechanism in which a copy of information acquired from a network is held and the held copy is subjected to display or the like at the time of second and subsequent accesses, thereby shortening a time required up to display or the like and reducing a load imposed on the network. Also, the present invention relates to the pre-reading and caching of information having a high possibility that a user browses the information. Further, the present invention relates to a processing which is performed in the case where a cache is constituted in a removable storage medium and when the storage medium is removed.

BACKGROUND ART

In recent years, social attention to a World Wide Web (WWW) service through the Internet has been given as a typical example of utilization of the Internet. The acquisition and browsing of information opened to the public in all the world have become possible by connecting a household personal computer to the Internet through a telephone line or the like and operating a WWW browser program. In this case, a time from the designation of information to be acquired to the enabling of actual browsing of the information may be taken due to the insufficiency of the band of a communication line. In order to cover or hide this delay time, there is known a method for constitution of a cache storage for browse information in which a copy of information having once been browsed is stored in a secondary memory device (for example, a hard disk drive or the like) and the stored copy is retrieved from the secondary memory device at the time of second and subsequent browsings.

Generally, in the case where information is retrieved through a network, the problem of a delay time arises. A method of covering this delay by use of a cache memory has been disclosed JP-A-62-6355 filed in Japan.

Also, JP-A-63-201743 filed in Japan has disclosed a method in which the efficiency is improved by using a cache for the access of information through a network though a point of the disclosed invention lies in means for ensuring the effectiveness of the cache.

If a WWW browser program or browser apparatus provided with a cache is used, it is possible to cover delay times for second and subsequent accesses.

However, in the case where a user utilizes another browser apparatus, it is not absolutely possible to enjoy a merit caused by the above effect. Now assume that there are two or first and second browser apparatuses having a similar specification. Even if a user having browsed certain information by use of the first browser apparatus moves to the second browser apparatus and tries to browse the same information, there is no assurance that the information is included in a cache of the second browser apparatus. In the user's point of view, information having once been browsed by the user himself or herself should be displayed immediately at the time of second browsing even if the other browser apparatus is used. This is a first problem to be solved by the present invention.

In a WWW browser, it is general that the successive tracing (or jumping) of information is made by means of hyperlink. A character string set with hyperlink is called an anchor. When the jumping by the hyperlink is made by designating, a delay time for network access is taken in the case where information at the destination of jumping is information which has not yet been inspected. When the connection is made using a low-speed line such as a telephone line, there may arise the case where a comfortable browsing work cannot be conducted. This is a second problem to be solved by the present invention.

In order to solve the first problem, a memory device including a removable storage medium stored with information is used. In the case where this storage medium is removed, there is a write processing to be completed prior to the removal. In the case where a user operates an eject button with which the memory device is provided, it is not always that the completion of the write processing is ensured. This is a second problem to be solved by the present invention.

DISCLOSURE OF INVENTION

The first problem can be solved by a construction with which a user is allowed to carry a cache of information having been browsed by the user himself or herself. A memory device including a removable storage medium stored with information may be used so that a cache is constituted in the removal storage medium. In the case where an access time of this memory device is longer than that of another secondary memory device, for example, a hard disk drive, those memories are used in combination to constitute the cache. It is constructed such that when the storage medium is pulled out or a browser program is completed, all of information stored in the cache inclusive of the other secondary memory device are written into the storage medium. By carrying such a storage medium, the user can restart a browsing work smoothly. In an extreme case, the browsing is possible even by a browser apparatus connected to no network so long as it concerns the browsing of information recorded in such a storage medium.

In order to solve the second problem, information having a high possibility of designation by the user is stored in the cache beforehand through pre-reading. There is a high possibility that the user designates any one of anchors buried in browse information. Over all, provided that the possibility of designation of an anchor being displayed presently in a display window is high, information at the destination of hyperlink for the anchor being displayed is stored into the cache.

The third problem can be solved by a construction in which in the case where the user operates an eject button, the ejection of the storage medium is not immediately conducted but a routine for performing a write processing required on the system side is started so that after the write processing is completed, a signal indicating the instruction for or permission of ejection of the storage medium is given from the system side to the memory device.

More particularly, in a terminal apparatus, a storage medium for storing information from a network as cache data is made freely detachable. Also, there is provided means for recording the information as cache data into a secondary memory device other than the storage medium. Further, there is provided means for recording the cache data into the storage medium as cache data which is also usable in another terminal apparatus. Furthermore, a first directory table for associating an address of the information on a network and an address of the information on the storage medium stored as the cache data in the storage medium is provided in the storage medium, a second directory table for associating an address of the information on the network and an address of the information on the secondary memory device stored as the cache data in the secondary memory device is provided in the secondary memory device, and there is provided means for making the search of cache data by use of a third directory which is generated by merging the first directory table and the second directory table with the address of the information on the network used a key and is provided with a field for the address on the storage medium and a field for the address on the secondary memory device.

Also, in a method for information access from a terminal apparatus used in a manner connected to a network, the method comprises a step of writing a copy of information from a network into a storage medium which is freely detachable from the terminal apparatus, a step of first making access to the storage medium when the terminal apparatus makes access to the information, and a step of acquiring the information through the network in the case where there is not the information in the storage medium.

Also, in a recording medium freely detachable from a terminal apparatus, the recording medium has a portion in which a program executed by the terminal apparatus is recorded, and a portion in which information from the network to which the terminal apparatus is connected is recorded as cache data by the program. Otherwise, in a recording medium freely detachable from a terminal apparatus, the recording medium has a portion recorded with a program by which information from the network to which the terminal apparatus is connected is recorded as cache data into a recording medium freely detachable from the terminal apparatus.

Also, in a method for information acquisition from a terminal apparatus which acquires information from a network, the method comprises a step of applying the order of preference to anchors displayed in a display window of the terminal apparatus, and a step of acquiring, before a user makes the designation of an anchor, information at the destination of link indicated by the anchor through the network in accordance with the order of preference. The method further comprises a step of interchanging, the display attribute of an anchor the acquisition of which starts before the user makes the designation of an anchor, the display attribute of an anchor the acquisition of which has been completed, and the display attribute of an anchor the acquisition of which has not yet started.

Also, in a method for information access from a terminal apparatus which acquires information from a network, the method comprises a step of applying the order of preference to anchors displayed in a display window of the terminal apparatus, a step of acquiring, before a user makes the designation of an anchor, information at the destination of link indicated by the anchor through the network in accordance with the order of preference, and a step of recording the information from the network as cache data into a recording medium which is freely detachable from the terminal apparatus.

Also, in a memory device including a removable storage medium stored with information, when the indication of ejection of the storage medium is given from a user to the memory device, a write processing for the storage medium is performed in the case where information to be recorded in the storage medium exists in the memory device and a system to which the memory device is connected, and an instruction for or the permission of ejection of the storage medium is given from the system to the memory device after the write processing is completed.

Also, in a system in which the combination of a memory device including a removable storage medium stored with information and another secondary memory device is used as a cache storage for storing a copy of information acquired through a network and the cache storage is controlled in such a manner that it is also held in the storage medium, it is constructed so that when the indication of ejection of the storage medium is given from a user to the memory device, a write processing for the storage medium is performed in the case where information to be recorded in the storage medium exists in the cache storage, and an instruction for or the permission of ejection of the storage medium is given from the system to the memory device after the write processing is completed.

BRIEF DESCRIPTION OF DRAWINGS

FIG. 6 is a diagram illustrating the whole of a Web cache management table;

FIG. 7 is a diagram illustrating the Web cache management table;

FIG. 8 is a diagram illustrating the Web cache management table;

FIG. 9 is a diagram illustrating the Web cache management table;

FIG. 10 is a diagram illustrating a Web cache management table on a hard disk;

FIG. 11 is a diagram illustrating a Web cache management table on a DVD-RAM;

FIG. 12 is a diagram illustrating a pre-read list;

FIG. 18 is a time chart concerning a disk ejection processing.

BEST MODE FOR CARRYING OUT THE INVENTION

Embodiments of the present invention will be described using FIGS. 1 to 18.

Figure 2:
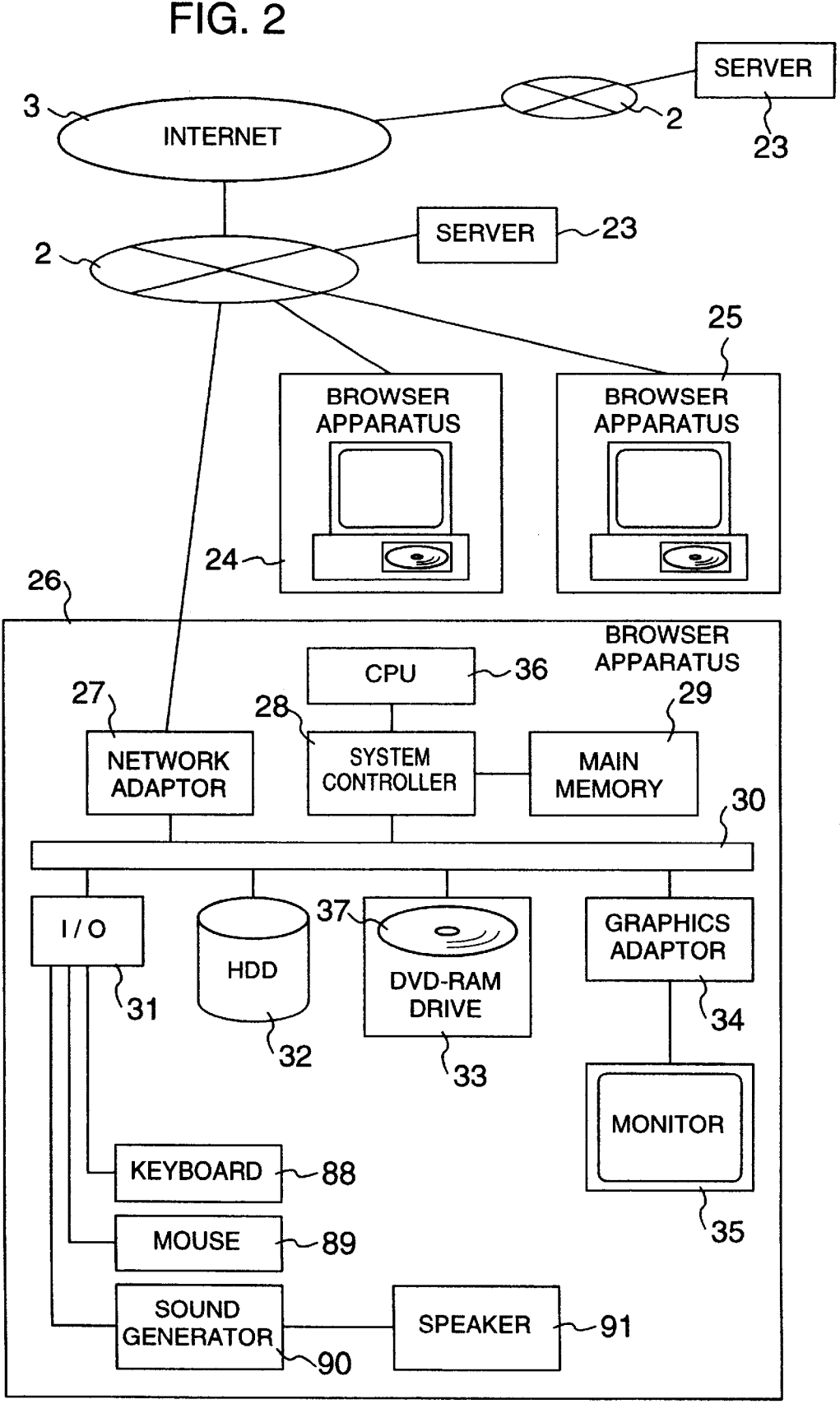
FIG. 2 is a diagram illustrating the hardware construction of the browser apparatus.

First, the hardware construction of a browser apparatus and the connection relation thereof with a network will be described using FIG. 2. A server apparatus 23 for providing a World Wide Web (hereinafter abbreviated to Web) service or the like and browser apparatuses 24, 25 and 26 as Web service clients are connected to a local area network (hereinafter abbreviated to LAN) 2. The numbers of the server apparatus 23 and the browser apparatuses 24, 25 and 26 connected to the LAN 2 are shown as an example and it is not limited to the shown example. The LAN 2 is connected to the Internet 3. The Internet 3 is also connected with another LAN 2 to which a server apparatus 23 is connected. The number of LAN's 2 connected to the Internet 3 is also not limited to the shown example. In the present specification, the combination of the LAN 2 and the Internet 3 may be called a network. The browser apparatuses 24, 25 and 26 can receive a Web service from any one of the server apparatuses 23 through the Internet 3. The browser apparatuses 24 and 25 are shown as an example representing their external appearances.

The browser apparatus 26 is shown to provide its hardware construction. The browser apparatus 26 includes a system bus 30, a CPU 36, a system controller 28, a main memory 29, a hard disk drive (hereinafter abbreviated to HDD) 32, a DVD-RAM drive 33, a network adaptor 27, an input/output device 31, a graphics adaptor 34, a monitor device 35, a keyboard 88, a mouse 89, a sound generator 90, and a speaker 91. The CPU 36 is connected to the main memory 29 and the system bus 30 through the system controller 28. The system controller 28, the HDD 32, the DVD-RAM drive 33, the network adaptor 27, the input/output device 31 and the graphics adaptor 34 are connected to the system bus 30. The DVD-RAM drive 33 is mounted with a DVD-RAM disk 37 and performs the writing, reading and erasion of information for the DVD-RAM disk 37. The DVD-RAM disk 37 is removable from the DVD-RAM disk 33. The monitor device 35 is connected to the graphics adaptor 34. The monitor device 34 referred to in the present specification is, for example, a display device provided with a CRT. The network adaptor 27 is connected to the LAN 2. The keyboard 88 and the mouse 89 are connected to the input/output device 31. A user can issue instructions and commands to the browser apparatus by use of the keyboard 88 and the mouse 89. The sound generator 90 is connected to the input/output device 31, and the speaker 91 is connected to the sound generator 90. Thereby, the user can listen a voice included in information which the user browses.

Figure 1:
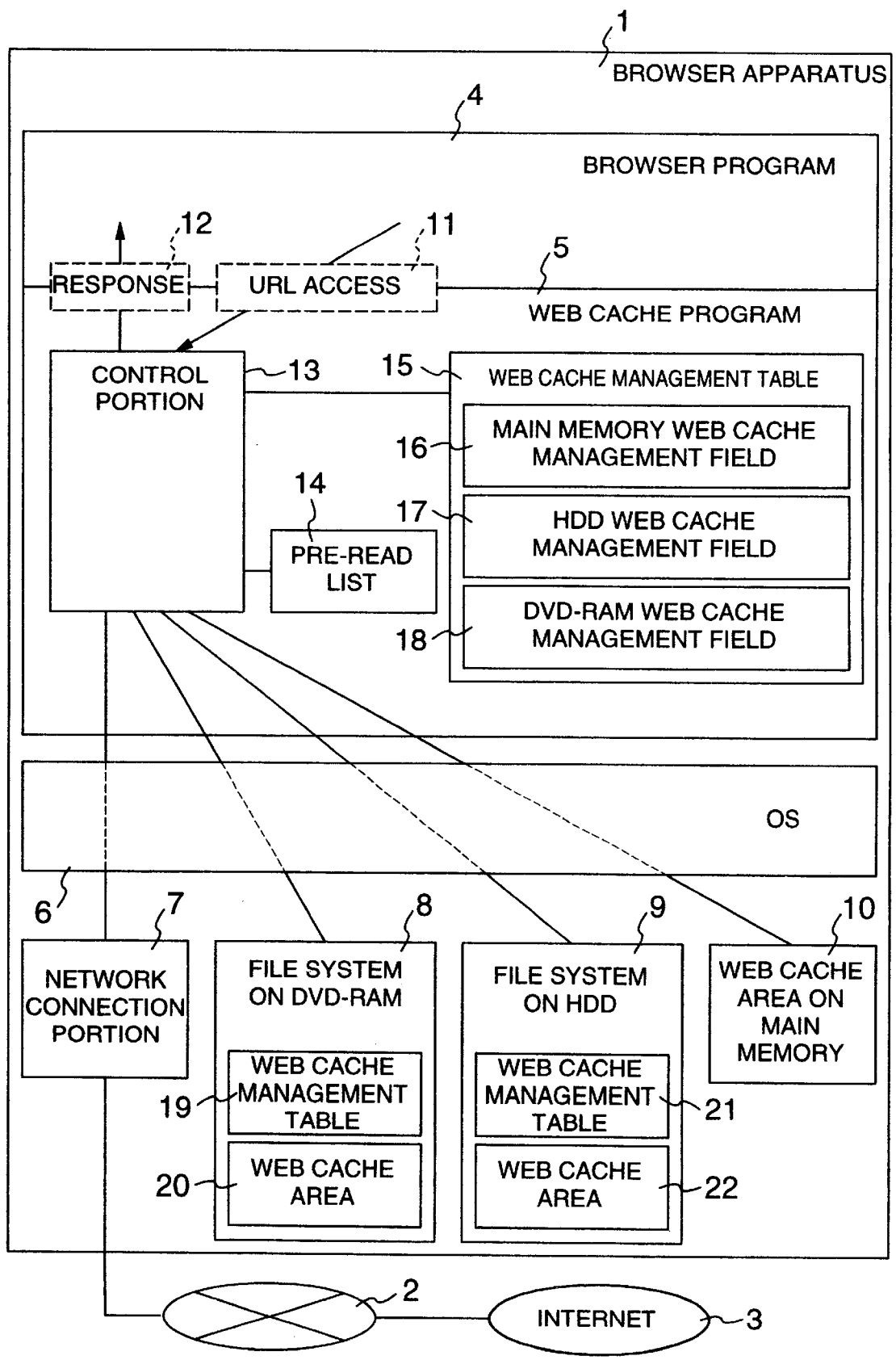
FIG. 1 is a diagram illustrating the logical construction of programs and so forth in a browser apparatus.

Next, the outline of the construction of programs and so forth operating in the browser apparatus and the operation thereof will be described using FIG. 1. A browser apparatus 1 provides the same function as those of the browser apparatuses 24, 25 and 26. It is assumed that the browser apparatus 1 is connected to the LAN 2 and the LAN 2 is connected to the Internet 3. In the browser apparatus 1, an operating system (hereinafter abbreviated to OS) 6 operates to perform the control of the whole of the browser apparatus 1. Under the control of the OS 6, a browser program 4 and a Web cache program 5 operate. A file system 8 is formed on the DVD-RAM disk in the DVD-RAM drive 33. A file system 9 is formed on the HDD 32. A Web cache area 10 is ensured on the main memory 29. A network connection portion 7 performs communication with the LAN 2.

Figure 13:
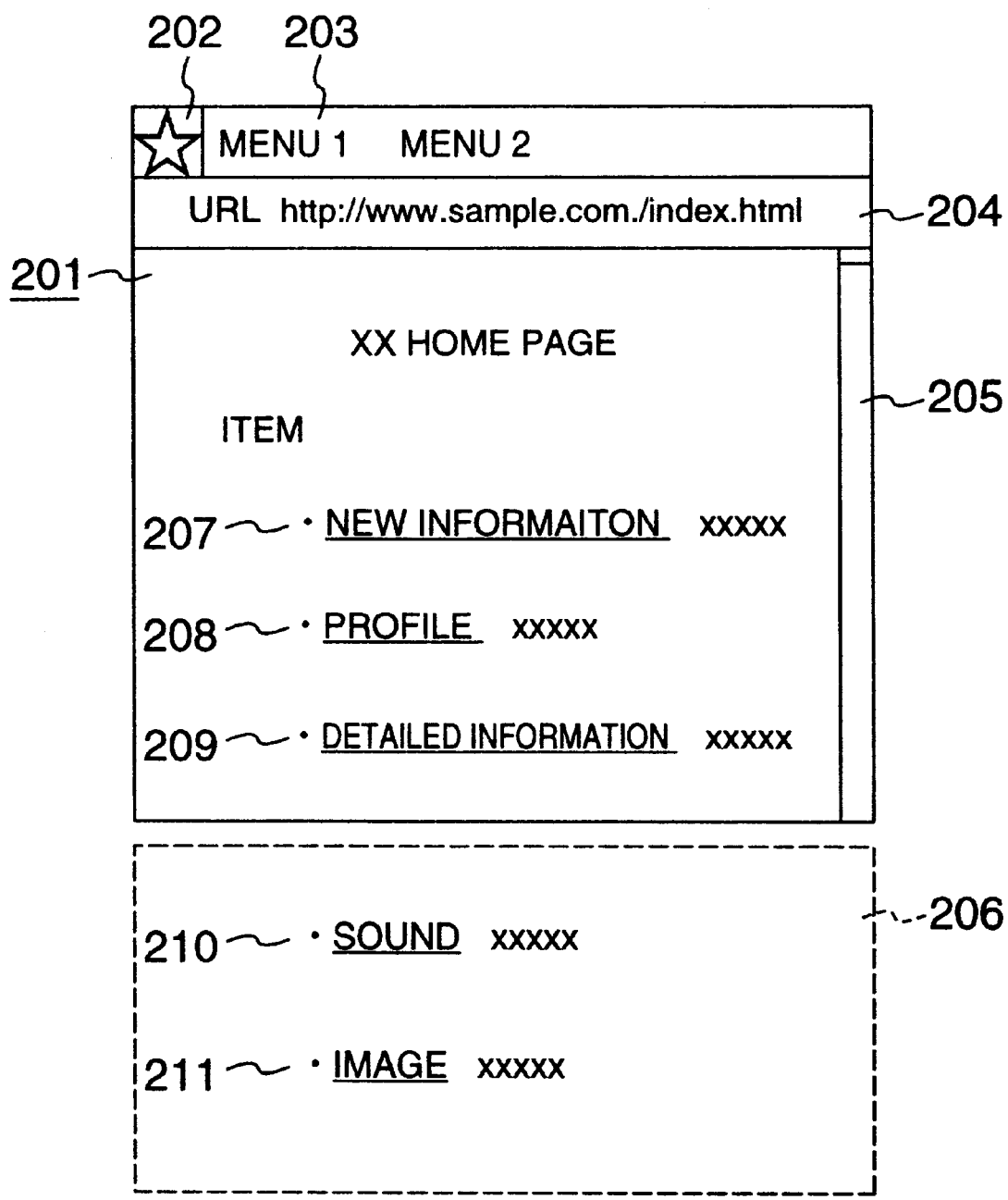
FIG. 13 is a diagram illustrating a display window of a browser program and a pre-read processing.

The browser program 4 receives a URL (Uniform Resource Locator) designated by a user by means of the keyboard 88 or the mouse 89, acquires information from a Web service or the like provided by the server apparatus 23, and displays a window as shown in FIG. 13 on a display screen of the monitor device 35 so that the acquired information is displayed in the window in a form capable of being understood by the user. The URL is an address for uniquely defining the location of information such as an article, image, sound or the like provided through the Internet 3. The window shown in FIG. 13 will be described later on. The user can browse various information provided through the Internet 3 by inputting a desired URL into the window displayed in accordance with the browser program 4.

In the simplest form as the program construction of the browser apparatus 1, all URL requests are directly transferred to the OS 6 to acquire information one by one through the network connection portion 7 from the server apparatus 23 via the LAN 2 and the Internet 3. On the other hand, when there turns into a situation in which the band width of the LAN 2, the Internet 3 and a connection portion of the LAN 2 and the Internet 3 is insufficient, that is, a situation in which the network is congested or over-crowded, a delay time from the issuance of a URL request to the return of designated information becomes long, thereby deteriorating the responsibility. According to circumstances, there may be the case where the delay time becomes long so that a time-out is caused in the browser program 4, which provides a factor of obstructing the user's productivity. In order to shorten this delay time apparently and to reduce a load imposed upon the network, there is commonly used a method in which information having once been browsed is stored in a cache in the browser apparatus and when the same information is designated again, the information is retrieved from the cache instead of retrieving it through the LAN 2 and the Internet 3. It is general that such a cache is constituted in the file system 9 of the HDD 32. In the present specification, this cache is called a Web cache.

One feature of the present embodiment lies in that a Web cache is constituted in not only the HDD 32 but also the file system 8 of the DVD-RAM disk in the DVD-RAM drive. Also, an area may be ensured on the main memory 29 so that a Web cache is constituted in that area. The Web cache program 5 is provided for integratively managing such physically distributed Web caches.

The Web cache program 5 has a Web cache control portion 13, a pre-read list 14 and a Web cache management table 15 therein. The pre-read list 14 will be described later on by use of FIG. 12. The Web cache management table 15 includes a main memory Web cache management field 16, an HDD Web cache management field 17 and a DVD-RAM Web cache management field 18. The details of the Web cache management table 15 will be described later o by use of FIGS. 6 to 9.

The file system 9 on the HDD has a Web cache management table 21 and a Web cache area 22 ensured therein. Information to be stored in the Web cache of the HDD is written as a file into the Web cache area 22. A list of contents preserved in the Web cache area 22 is reflected by the HDD Web cache management field 17 of the Web cache management table 15. However, when the browser program 4 is completed, a copy of the contents of the HDD Web cache management field 17 is held into the Web cache management table 21.

The file system 8 on the DVD-RAM has a Web cache management table 19 and a Web cache area 20 ensured therein. Information to be stored in the Web cache of the DVD-RAM is written as a file into the Web cache area 20. A list of contents preserved in the Web cache area 20 is reflected by the DVD-RAM Web cache management field 18 of the Web cache management table 15. However, when the browser program 4 is completed, a copy of the contents of the DVD-RAM Web cache management field 18 is held into the Web cache management table 19. Also, when the DVD-RAM disk is removed under operation of the browser program 4, the contents of the DVD-RAM Web cache management field 18 at that point of time are copied into the Web cache management table 19 and the DVD-RAM disk is thereafter ejected. Also, immediately before the disk is ejected, time information at that point of time may be written into the DVD-RAM disk.

The main memory 29 has the Web cache area 10 ensured thereon. A list of contents preserved in the Web cache area 10 is reflected by the main memory Web cache management field 16 of the Web cache management table 15. At the time of completion of the browser program 4, the Web cache area 10 is released.

When a URL access request 11 is received from the browser program 4, the control portion 13 searches the pre-read list 14 and the Web management table 15 to examine whether or not a copy of designated information is preserved in any one of the main memory, HDD and DVD-RAM. In the present specification, the existence of designated information in any Web cache is called hit and the non-existence thereof is called miss. In the case of hit, the examination is made as to which file of which Web cache is the information preserved in. The corresponding file is retrieved and the contents of the retrieved file are provided as a response message 12 to the browser program 4. In the case of miss, the URL access request message 11 is transferred to the OS 6. The OS 6 makes access to the network by use of the network connection portion 7 to retrieve the information from a proper server apparatus and gives the retrieved information to the control portion 13. The control portion 13 provides the contents of the received information as the response message 13 to the browser program 4. At the same time, that information is stored into the Web cache. Though the above is the outline of the operation of the control portion 13, a detailed flow will be described later on by use of FIGS. 4 and 5.

In the case of hit, the acquisition of information through the network is not required, thereby making it possible to shorten a delay time from the designation of URL by the user to the display of information. Thus, the Web cache program 5 assists a data retrieval operation of the browser program 5 to shorten a time required for retrieval. This is a general feature of a browser apparatus provided with cache.

Figure 3:
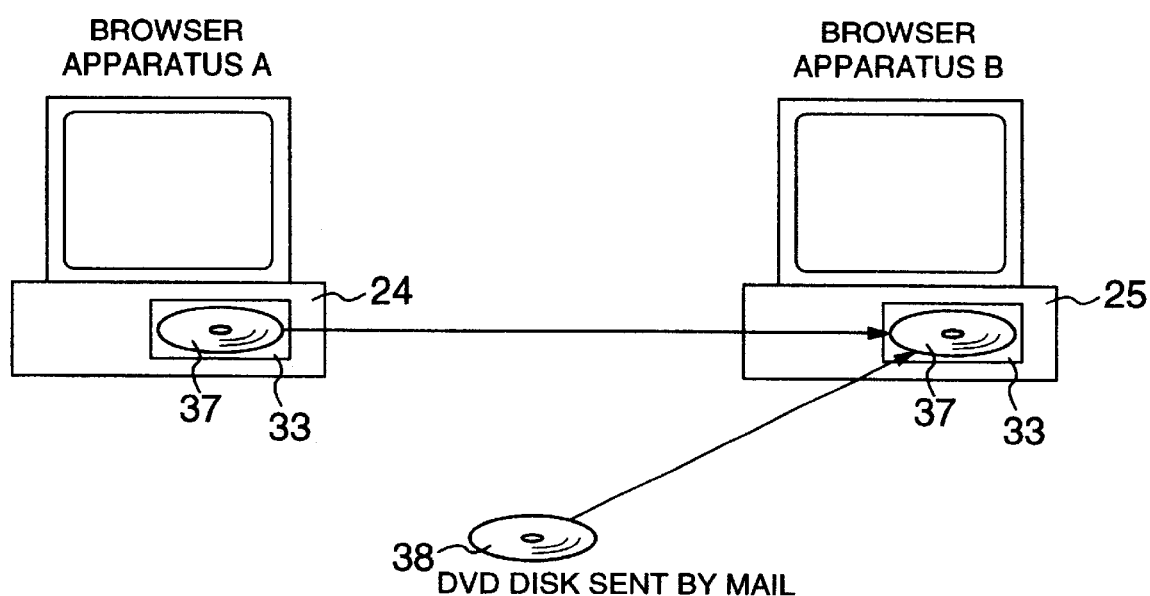
FIG. 3 is a diagram illustrating an example of utilization of browser apparatuses according to the present invention and the effects thereof.

Features of the browser apparatus to which the present invention is applied will be described using FIG. 3. It is now assumed that a user mounts a DVD-RAM disk 37 to a DVD-RAM drive 37 of a browser apparatus A 24 and makes the browsing based on a Web service. Information browsed by the user is stored into a Web cache area formed in the DVD-RAM disk 37 through the operation of a Web cache program 5. Hereupon, it is assumed that for the user's reason, the user stops the browsing by the browser apparatus A 24 and moves to a browser apparatus B 25 to restart the browsing. At this time, the user removes the DVD-RAM disk 37 from the browser apparatus A and mounts it to a DVD-RAM drive 33 of the browser apparatus B 25. And, it is assumed that the information browsed by use of the browser apparatus A some time ago is confirmed by the user again. In this case, it is not always that the same information is certainly stored in a Web cache constituted in a HDD 32 of the browser apparatus B 25. However, the same information is certainly stored in the Web cache in the DVD-RAM disk 37 removed from the browser apparatus A and carried by the user. A web cache program of the browser apparatus B 25 retrieves information from the DVD-RAM disk 37 and gives the retrieved information to a browser program 4. Accordingly, a delay time from the designation of URL to the display of information can be shortened. This effect is equivalent to that in the case where the user continuously performs the browsing work by use of the browser apparatus A 24. Thus, the user can carry the DVD-RAM disk 37 with the his or her own Web cache environment taken therein.

Also, an information provider on the network can send a DVD-RAM disk 38 to the user (for example, by mail) after a plurality of information provided through the use of the server apparatus 23 by the provider is stored into a Web cache of the DVD-RAM disk 38. The user receiving the sent DVD-RAM disk 38 mounts it to the DVD-RAM drive 33 of the browser apparatus to perform the browsing. Even for information having never been browsed by the user, so long as the information is one stored in the Web cache of the DVD-RAM disk 38 by the information provider, the user can retrieve the information from this Web cache for browsing thereof without taking the trouble to acquire the information from the network. At this time, the user has no need to be conscious of the existence of desired information in the DVD-RAM disk 38. Like the case of a usual browsing, the designation of a URL applied to the information suffices for the user.

Thus, in the browser apparatus to which the present invention is applied, a Web cache is also constituted in a removable medium such as a DVD-RAM disk. This construction makes it possible to carry a cache environment for each user. Therefore, even if the movement from a certain browser apparatus to another browser apparatus is made, a time required for browsing can be shortened, thereby improving the productivity. Also, by obtaining from an information provider or the like a DVD-RAM disk in which a Web cache having information stored therein is constituted, a time required for browsing can similarly be shortened, even for information having not yet been browsed, with no need to be conscious of the existence of the information in the DVD-RAM disk.

Figure 4:
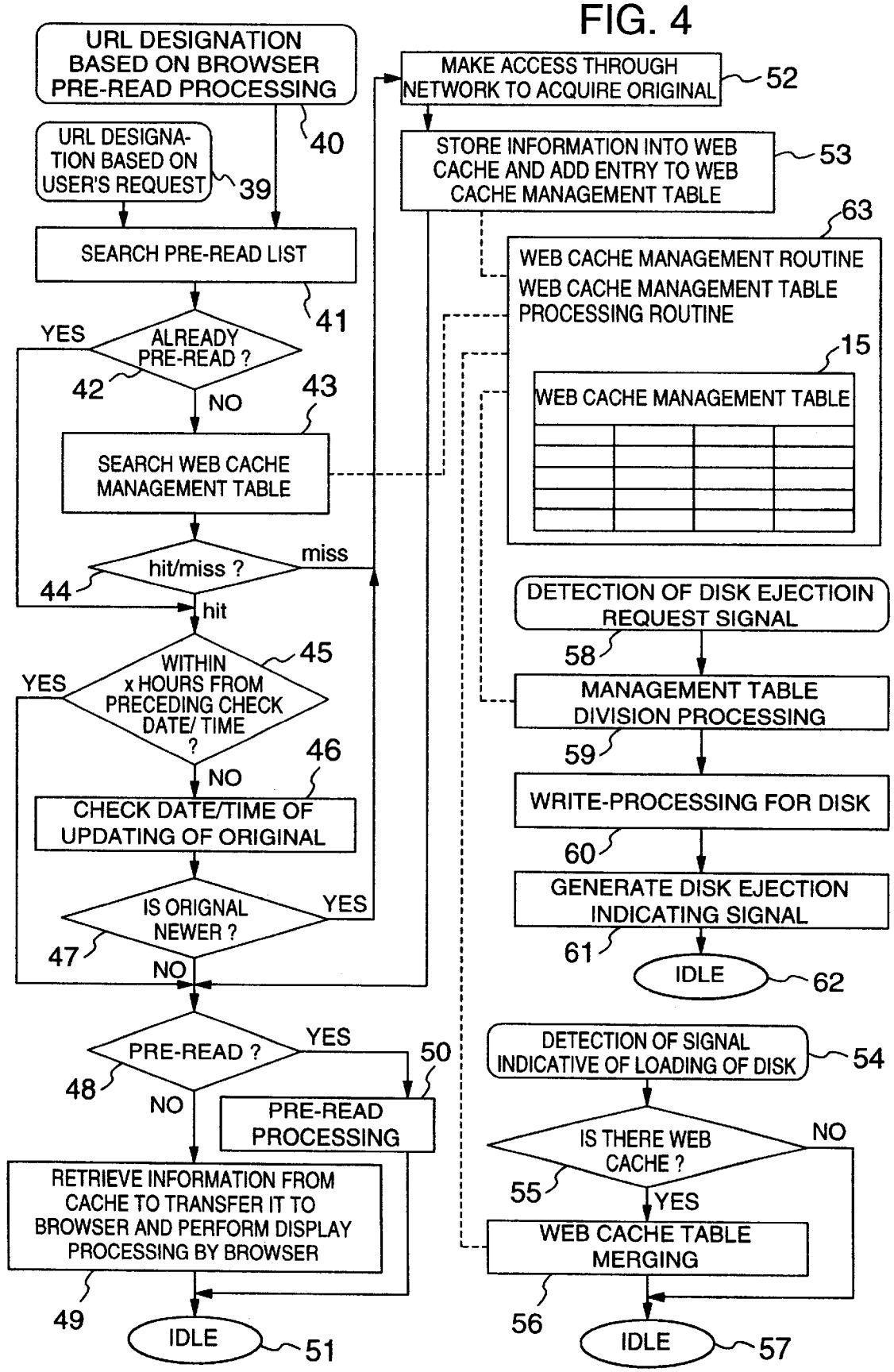
FIG. 4 is a diagram illustrating the overall control of Web caches.

The outline of the flow of an overall processing performed by the control portion 13 will be described using FIG. 4. A flow including events 39 and 40 and steps 41 to 53 illustrates the judgement of a Web cache as to hit/miss, a processing at the time of miss and a processing based on pre-reading which will be described later on. A flow including an event 54 and steps 55 to 57 illustrates a processing in the case where a DVD-RAM disk 37 is loaded and mounted to a DVD-RAM drive 33. A flow including an event 58 and steps 59 to 62 illustrates a processing in the case where the DVD-RAM disk 37 is removed from the DVD-RAM drive 33. Also, though not a flow, there is illustrated a relationship between a Web cache management table processing routine 63 and the above-mentioned flows. In FIG. 4, solid line with an arrow indicates the flow of the processing and dotted line indicates the relation of a request from a processing step for a processing for the Web cache management table processing routine 63.

The flow including the events 39 and 40 and the steps 41 to 53 will be described. This flow is activated due to the occurrence of any one of the two events 39 and 40. The event 39 occurs when a user designates a URL to a browser apparatus. This correspond to the designation of that information by a URL thereof which the user desires to browse. The event 40 occurs at the time of that pre-read request by the browser program 4 which will be described later on. A word of BROWSER in the event 40 shown in FIG. 4 is synonymous with the browser program 4.

Hereupon, brief description will be made of the pre-read processing. This processing is a processing in which for an anchor having a higher possibility of designation by a user in the near future, information at the destination of hyperlink of the anchor is stored in a Web cache beforehand in advance. An anchor is a portion which exists in browse information capable of being displayed and is associated with another information. This association is defined by a URL. In many cases, the designation of an anchor is made using the mouse 89. When an anchor is designated, there starts a browse processing for information designated by a URL buried in the anchor. Such browsing based on the designation of an anchor is called hyperlink. Detailed description of the pre-read processing, the anchor and the hyperlink will be made later on.

Though the events 39 and 40 have their different origins, they have the same effect in that the occurrence of a URL access request is meant. In any case, the flow proceeds to step 41. In step 41, there is performed a search processing for the pre-read list 14 in which a URL designated in the event 39 or 40 is taken as a search key. The structure of the pre-read list 14 will be described later on by use of FIG. 12.

Receiving the result of search, the flow proceeds to step 42. In the case where the result of search gives a miss, the flow proceeds to step 43. In the case where the result of search gives a hit, the flow skips over steps 43 and 44 and proceeds to step 45.

In step 43, there is performed a search processing for the Web cache management table 15 in which the URL designated in the event 39 or 40 is taken as a search key. As shown by dotted line, a request for a processing is made from step 43 to the Web cache management table processing routine 63. The Web cache management table processing routine 63 sends back the result of search (that is, hit or miss) and the result of processing, that is, which file stored in which one of the caches on the main memory, HDD and DVD-RAM is proper, when was the original of information stored in that file produced (or original production date/time), and when was the original production date/time checked (or check date/time).

Receiving the result of processing, the flow proceeds to step 44. In the case where the result of search in step 43 gives a miss, the flow proceeds to step 52. In the case where it gives a hit, the flow proceeds to step 45.

In step 45, the check date/time sent back from the Web cache management table processing routine 63 is examined. If a time from the preceding check date/time to the present point of time is shorter than, for example, 24 hours, the flow skips over steps 46 and 47 and proceeds to step 48. If the time from the preceding check date/time to the present point of time is not shorter than 24 hours, the flow proceeds to step 46. Though the time of 24 hours is here taken as a reference for judgement, this time is one example for explanation. Also, if this numerical value can be set by a user, it is more convenient.

In step 46, access is made through the network to a server apparatus 23 in which the original of information designated by the URL is stored, thereby confirming the date/time of production of the original. This is made for examining whether or not the original on the server apparatus 23 is updated newly as compared with a copy of information designated by the URL and stored in the Web cache.

In step 47, the result of examination is received and the flow proceeds to step 52 when the original on the server apparatus 23 is newer. When the case is not so, the flow proceeds to step 48.

Hereupon, a processing in steps 52 and 53 at the designation of jumping from step 44 or 47 will be described.

In step 52, access is made through the network to the server apparatus 23 in which the original of information designated by the URL is stored, thereby acquiring the corresponding information.

In step 53, there is performed a processing in which the information acquired from the network is stored into the Web cache. This update processing for the Web cache will be described later on by use of FIG. 5. Also, a request for an update processing for the Web cache management table 15 associated with the update processing for the Web cache is made to the Web cache management table processing routine 63. In the Web cache management table processing routine 63, information of an entry having the designated URL is updated if that entry has already existed. On the other hand, if there is no corresponding entry, an entry is newly added.

Next, the flow proceeds to step 48. Step 48 is the destination of jumping of steps 45, 47 and 53. In step 48, the judgement is made of whether this flow is caused from the event 39 or caused from the event 40. In the case where there is caused from the event 39, the flow proceeds to step 49. In the case where there is caused from the event 40, the flow proceeds to step 50.

In step 49, information is retrieved from the Web cache and is then transferred to the browser program 4. When the information is received, the browser program 4 displays the information on the display screen of the monitor device 35 in a form capable of being browsed by the user.

In step 50, the pre-read list 14 is updated in order to indicate that the pre-reading is made for the designated URL so that information is stored in the Web cache.

At step 51, the flow under consideration is completed.

Next, the flow including the event 54 and the steps 55 to 57 will be described. With this flow, there is performed a processing in the case where the DVD-RAM disk 37 is loaded and mounted to the DVD-RAM drive 33 under operation of the Web cache program 5.

This flow is activated due to the occurrence of the event 54. The event 54 occurs on the basis of the detection of a signal indicative of the mounting of the DVD-RAM disk 37 to the DVD-RAM drive 33.

In step 55, the examination is made of whether or not a Web cache is constituted in the mounted DVD-RAM disk 37. If the Web cache is constituted, the flow proceeds to step 56. If the case is not so, the flow proceeds to step 57.

In step 56, the Web cache management table 19 formed in the file system 8 on the mounted DVD-RAM disk 37 is merged into the Web cache management table 15 in the Web cache program 5. This is performed using the URL as a key. A request for this processing is made to the Web cache management table processing routine 63.

At step 57, the flow under consideration is completed.

Next, the flow including the event 58 and the steps 59 to 62 will be described. With this flow, there is performed a processing in the case where the DVD-RAM disk 37 is removed from the DVD-RAM drive 33 under operation of the Web cache program 5.

This flow is activated due to the occurrence of the event 58. The event 58 occurs on the basis of the detection of a signal indicative of a request for ejection of the DVD-RAM disk 37 from the DVD-RAM drive 33.

In step 59, an entry including written data in the field of information concerning the Web cache on the DVD-RAM is extracted from the entries of the Web cache management table 15. Further, only the fields of URL, file attribute and information concerning the Web cache on the DVD-RAM are extracted. A request for this processing is made to the Web cache management table processing routine 63.

In step 60, the entry of the Web cache management table extracted in step 59 is written into the Web cache management table 19 of the DVD-RAM. In the case where the body of information to be stored in the Web cache area 20 of the DVD-RAM has not yet been written, it is also written. This case includes, for example, the case where a copy processing for information to be copied from the Web cache area 22 of the HDD into the Web cache area 22 of the DVD-RAM is reversed. Also, the date and time at the present point of time are written in order to indicate when this DVD-RAM disk 37 is removed from the control by the Web cache program. At this time, the time to be written may be written with the conversion thereof into a Greenwich mean time or a time difference between a reference time of the system and the Greenwich mean time may be written simultaneously. In the former case, there may be written information indicating that the written time is the Greenwich mean time and information of a time difference which the Greenwich mean time takes from the reference time of the system. Information of the date and time of removal of the disk and information of the time difference from the Greenwich mean time are used when this DVD-RAM disk 37 is next mounted to the browser apparatus so that it is used as a Web cache. Even if the user moves over a time zone, time information such as the date/time of check of browse information can be corrected on the basis of the time difference information. Also, for example, if the preceding disk removal time is one month ago, it is found with no examination of the Web cache management table that the check date/time for all browse information cached in the DVD-RAM disk 37 is one month or more than ago. If this information is used, it is possible to reduce, for example, the processing in step 45.

In step 61, a signal indicating the ejection of the DVD-RAM disk 37 is generated for the DVD-RAM drive 33. This signal may be a disk ejection instructing signal or a disk ejection permitting signal. The details of a procedure for disk ejection will be described later on by use of FIGS. 15 to 18.

At step 62, the flow under consideration is completed.

Figure 5:
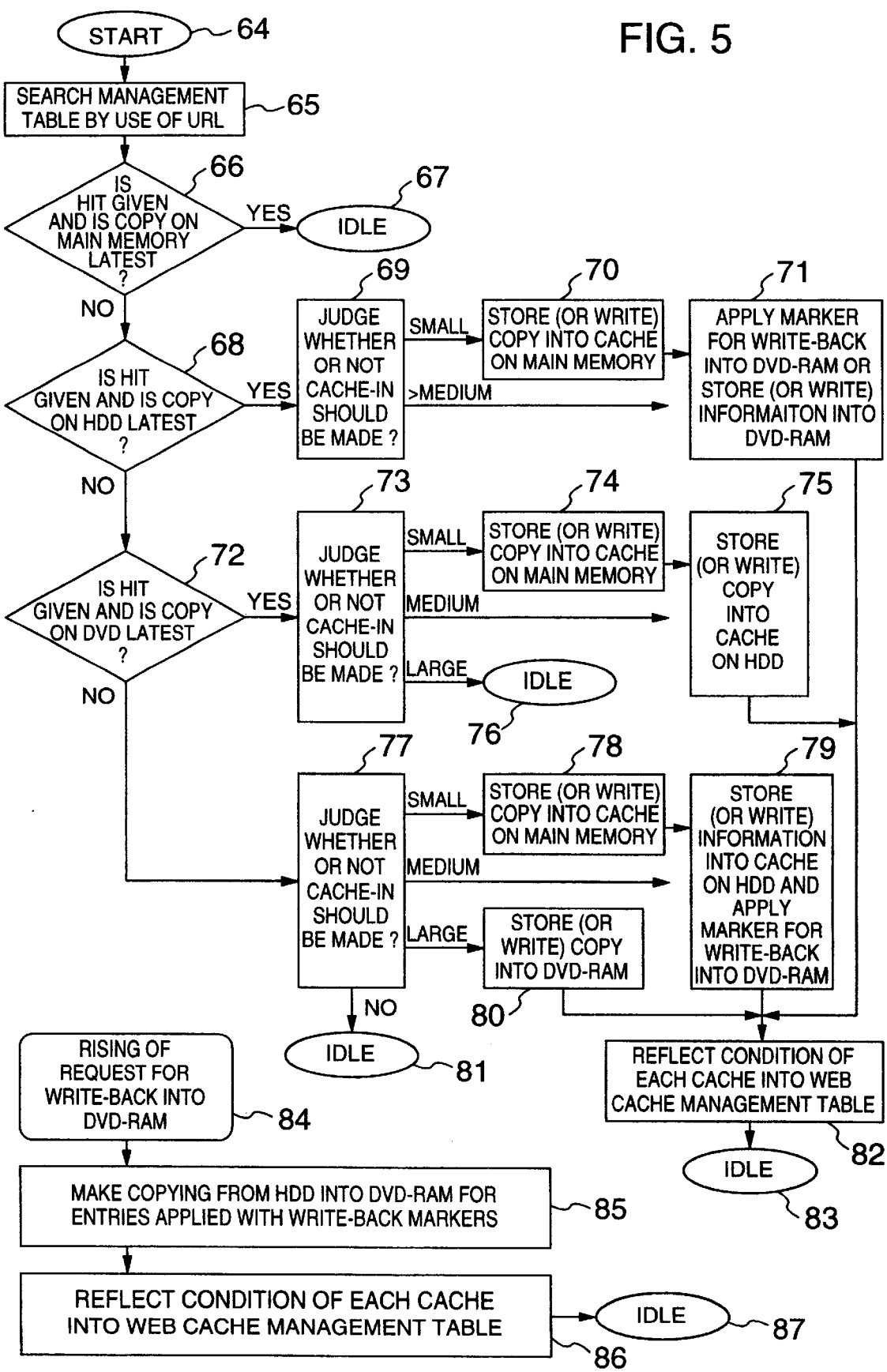
FIG. 5 is a diagram illustrating an algorithm for management of Web caches.

Next, an algorithm for management of Web caches (or Web cache management routine) will be described using FIG. 5. This flow is a processing for storing the body of browse information into a Web cache and reflecting the condition of the result of storage in the Web cache management table 15 to keep the consistency.

This flow starts from step 64. This may also be activated by a request from step 43 or step 53 shown in FIG. 4.

In step 65, the Web cache management table 15 is searched with a URL used as a key.

In step 66, the result of step 65 is received and the flow proceeds to step 67 in the case where the URL gives a hit, an original production date/time is the latest and a check date/time is the latest. In the other case, the flow proceeds to step 68. The latestness of the original production date/time is confirmed by comparing an original production date/time in the field of information concerning the Web cache on the main memory, an original production date/time in the field of information concerning the Web cache on the HDD and an original production date/time in the field of information concerning the Web cache on the DVD-RAM. For example, in the case where the production date/time of the copy on the main memory and the production date/time of the original on the HDD are the same and both the latest, the respective check date/times therein are then confirmed to judge which one of the check date/times is the latest. In the case where both the check date/times are the same, it is judged that a copy on the main memory is the latest. Subsequently, the comparison of original production date/times and the comparison of check date/times are similarly made to judge which Web cache (or the Web cache on which one of the main memory, HDD and DVD-RAM) is the latest copy stored in. In the case of the same date/time, the order of preference to be employed is defined such that the orders of preference of the main memory, HDD and DVD-RAM are the highest, the highest but one and the highest but two, respectively and the latest copy is determined on the basis of such defined preference. This order of preference is determined by an access speed. A medium having a higher access speed is preferred. If a new medium other than the DVD-RAM is employed as a removable medium and the access speed of the new medium is higher than that of the HDD, the preference is given in the order of the main memory, new medium and HDD.

In the case where the flow proceeds to step 67, the flow is completed at this step since any further cache management is not required.

In step 68, the result of step 65 is received and the flow proceeds to step 69 in the case where URL gives a hit and a copy stored in the Web cache on the HDD is the latest. In the other case, the flow proceeds to step 72.

In step 69, the judgement is made of whether or not the copy on the HDD should be copied (or cached) into the other Web cache (on the main memory or DVD-RAM). This judgement is made with the attribute of the corresponding file on the HDD taken as a clue. For example, the size of the file is taken as a reference of judgement. For example, in the case where the size of the corresponding information is smaller than 500 KB, the flow proceeds to step 70 upon judgement of the size of the information as being small. In the other case, the flow proceeds to step 71 upon judgement of the size of the information as being medium or larger than that.

In step 70, the copy of the corresponding information on the HDD is copied into the Web cache on the main memory.

In step 71, the corresponding information on the HDD is copied into the Web cache on the DVD-RAM or preparations for copying are made. The latter becomes necessary in the case where the writing is performed for the DVD-RAM on the basis of a write-back system. In the write-back system, files or the like to be written in the DVD-RAM are not written one by one. Thereinstead, a marker indicating the necessity of writing is applied to each file and the files having such markers applied thereto are written Into the DVD-RAM en bloc when a due opportunity comes around after a while. The above-mentioned preparations for copying are a processing for applying the markers.

In step 72, the result of step 65 is received and the flow proceeds to step 73 in the case where URL gives a hit and a copy stored in the Web cache on the DVD-RAM is the latest. In the other case, the flow proceeds to step 77.

In step 73, the judgement is made of whether or not the copy on the DVD-RAM should be copied (or cached) into the other Web cache (on the main memory or HDD). This judgement is made with the attribute of the corresponding file on the DVD-RAM taken as a clue. For example, the size of the file is taken as a reference of judgement. For example, in the case where the size of the corresponding information is smaller than 500 KB, the flow proceeds to step 74 upon judgement of the size of the information as being small. For example, in the case where the size of the information is smaller than 5 MB, the flow proceeds to step 75 upon judgement of the size of the information as being medium. In the case where the size of the information is equal to or larger than 5 MB, the flow proceeds to step 76 upon judgement of the size of the information as being large.

In step 74, the copy of the corresponding information in the DVD-RAM is copied into the Web cache of the main memory.

In step 75, the copy of the corresponding information on the DVD-RAM is copied into the Web cache of the HDD.

In step 76, it is determined that since the size of the corresponding information is large (for example, equal to or larger than 5 MB), the information should not be stored into the main memory or the HDD. Thereby, the flow is completed.

Next, description will be made of step 77. Step 77 is conducted in the case where the result of URL search gives a miss or in the case where the check of the production date/time of the original on the server apparatus 23 made in step 46 shown in FIG. 4 results in that the original is newer that any copy in the Web caches. In these cases, the corresponding information is acquired from the server apparatus 23 on the network (step 52 in FIG. 4). In step 77, the judgement is made of whether or not the information acquired from the server apparatus 23 on the network should be copied (or cached) into any one of the Web caches (on the main memory, HDD and DVD-RAM) or ones thereof. For example, the size of the file is taken as a reference of judgement. For example, in the case where the size of the corresponding information is smaller than 500 KB, the flow proceeds to step 78 upon judgement of the size of the information as being small. For example, in the case where the size of the information is smaller than 5 MB, the flow proceeds to step 79 upon judgement of the size of the information as being medium. In the case where the size of the information is equal to or larger than 5 MB, the flow proceeds to step 80 upon judgement of the size of the information as being large. Also, in the case where the size of the information is not defined, the flow proceeds to step 81. As an example of information in the case where the size is not defined, there may be considered information in a form in which it is incessantly sent from an information source.

In step 78, the acquired information is copied into the Web cache of the main memory.

In step 79, the acquired information is copied into the Web cache on the HDD and is applied with a marker for copying into the DVD-RAM based on the write-back system.

Step 80 results from the judgement of the size of the acquired information as being so large that the information cannot be copied into the Web cache of the main memory or HDD. In step 80, therefore, the information is copied into the Web cache of the DVD-RAM. This copy processing is performed not on the basis of the write-back system but immediately since there is no other place into which the copying is to be made.

In step 81, since there is no need for copying into the Web cache, this flow is completed.

Step 82 is the destination of jumping from steps 71, 75, 79 and 80. In step 82, the condition of each Web cache changed as the result of copy processing for that Web cache is reflected into the Web cache management table.

At step 83, the flow under consideration is completed.

Next, the flow including the event 84 and the steps 85 to 87 will be described. This flow becomes necessary in the case where the write-back system is employed for writing into the DVD-RAM.

This flow is activated due to the occurrence of the event 84. The event 84 occurs on the basis of the detection of the rising of a request for writing into the DVD-RAM on any opportunity. The opportunity may be, for example, the notice by a timer at fixed intervals, the notice that the total amount of information to be written exceeds a threshold value, an instruction from a user, a write request generated in step 60 of the flow concerning the disk ejection shown in FIG. 4, or a completion signal issued immediately before the completion of the Web cache program.

In step 85, the examination is made of markers applied to those entries in the Web cache management table 15 which are to be subjected to write-back, and all files corresponding to the marker applied entries are copied into the Web cache area 20 of the DVD-RAM.

In step 86, a change in Web cache of the DVD-RAM caused by the copy processing performed in step 85 is reflected into the Web cache management table 15. Also, there are erased the write-back markers applied to the entries for which the copying has been completed.

At step 87, the flow under consideration is completed.

Next, the details of the Web cache management table 15 will be described using FIGS. 6 to 9.

First, the framing of the Web cache management table 15 will be described by use of FIG. 6. The table is largely composed of six fields as follows. These fields include an entry number field 101, a URL field 102, a file attribute field 103, a main memory Web cache management field 16, an HDD Web cache management field 17 and a DVD-RAM Web cache management field 18. The entry number field 101 is a field in which a consecutive number of entries (rows) is to be inputted. The URL field 102 is a field in which a URL of the field is to be inputted. The file attribute field 103 is a field in which a file attribute is to be inputted. In the present embodiment, attention to a file size is paid as the file attribute. Though each of the three later fields 16, 17 and 18 is further divided into small fields, this will be described using FIGS. 7 to 9.

The details of the main memory Web cache management field 16 of the Web cache management table 15 will be described by use of FIG. 7. The field 16 is composed of a file name field 104, an original production date/time field 105 and a check date/time field 106. When information is to be stored into the Web cache area 10 of the main memory, the information is stored with a file name applied thereto. The field 104 is a field in which that file name is to be inputted. The field 105 is a field in which the production date/time of the original of information to be stored is to be inputted. The original is information designated by a URL on the server apparatus 23 on the network, and the original production date/time is the date/time of production of the original at the point of time when the information is retrieved. In the field 106 is to be inputted a date/time when the comparison between the production date/time of the original on the server apparatus 23 and the production date/time in the field 105 is made.

The details of the HDD Web cache management field 17 of the Web cache management table 15 will be described by use of FIG. 8. The field 17 is composed of a file name field 107, an original production date/time field 108, a check date/time field 109 and a write-back flag field 110. When information is to be stored into the Web cache area 22 of the HDD, the information is stored with a file name applied thereto. The field 107 is a field in which that file name is to be inputted. The field 108 is a field in which an original production date/time is to be inputted. The field 109 is a field in which a check date/time is to be inputted. The field 110 becomes necessary in the case where a processing for copying into the DVD-RAM is performed on the basis of the write-back system. A marker is applied to the field 110 of an entry corresponding to that one of files in the Web cache area 22 of the HDD for which the processing for copying into the DVD-RAM is required. This marker is used in the flow described using FIG. 5.

The details of the DVD-RAM Web cache management field 18 of the Web cache management table 15 will be described by use of FIG. 9. The field 18 is composed of a file name field 111, an original production date/time field 112 and a check date/time field 113. When information is to be stored into the Web cache area 20 of the DVD-RAM, the information is stored with a file name applied thereto. The field 111 is a field in which that file name is to be inputted. The field 112 is a field in which an original production date/time is to be inputted. The field 113 is a field in which a check date/time is to be inputted.

Next, the details of the Web cache management table 21 on the HDD will be described using FIG. 10. The table is largely composed of four fields as follows. These fields include an entry number field 114, a URL field 115, a file attribute field 116 and an HDD Web cache management field 117. The field 117 is further divided into three fields which include a file name field 118, an original production date/time field 119 and a check date/time field 120. This Web cache management table 21 on the HDD is generated at the time of completion of the Web cache program 5 by extracting entries which include written data in the HDD Web cache management field 17 of the Web cache management table 15.

Next, the details of the Web cache management table 19 on the DVD-RAM will be described using FIG. 11. The table is largely composed of four fields as follows. These fields include an entry number field 121, a URL field 122, a file attribute field 123 and an HDD Web cache management field 124. The field 124 is further divided into three fields which include a file name field 125, an original production date/time field 126 and a check date/time field 127. The writing into the Web cache management table 19 on the DVD-RAM is performed in step 60 of the flow at the time of disk ejection shown in FIG. 4, at the time of completion of the Web cache program 5 or in step 86 of the flow for write-back processing shown in FIG. 5. The Web cache management table 19 of the DVD-RAM subjected to writing is generated by extracting entries which include written data in the DVD-RAM Web cache management field 18 of the Web cache management table 15.

Next, the pre-read list 14 will be described using FIG. 12. The list is largely composed of five fields as follows. These fields include an entry number field 128, a URL field 129, a destination-of-storage field 130, a storage file name field 131 and a check date/time field. The addition of an entry into the pre-read list 14 is made in step 50 shown in FIG. 4. In the case of a pre-read processing by an instruction from the browser program 4, acquired information on the server apparatus 23 is stored into a Web cache. For that information, a URL, a destination of storage, a file name at the storage destination file name and a check date/time are written into the pre-read list 14. The information acquired in the pre-read processing is stored into any one of the main memory, HDD and DVD-RAM or plural ones thereof in accordance with the cache management algorithm shown in FIG. 5. The destination of storage represents which one of the main memory, HDD and DVD-RAM is the information stored in. However, for example, in the case where the information is stored in both the main memory and the HDD, the above-mentioned order of preference concerning the destination of storage is used and hence the destination of storage is the main memory. The storage destination file name is a file name at the destination of storage. The check date/time is an instant of time of acquisition of the information. In the case where a URL designated by a user exists in the pre-read list 14, the judgement as being a hit is made in step 41 shown in FIG. 4. Further, even if the Web cache management table 15 is not searched, it is possible to obtain a destination of storage at which the optimum copy is stored and a file name at the destination of storage. The check date/time is used in step 45 shown in FIG. 4.

Next, FIG. 13 will be used for describing a browsing window 201 which the browser program 4 displays on a display screen of the monitor device 35 and how does the browser program 4 issue a pre-read request. The browsing window 201 includes a symbol mark 202, a menu bar 203, a URL input column 204 and a scroll bar 205. Into the URL input column 204, a user inputs the URL of information the browsing of which is desired by the user. The menu bar 203 has a plurality of menus and a command can be issued to the browser program 4 by using the menu. The scroll bar 205 can be used to scroll the display, thereby enabling the browsing of portions which cannot be displayed up at once. An area 206 enclosed by dotted line is an area which cannot be displayed up (or an area to be displayed after the scrolling). Such an area can be displayed using the scroll bar 205. When the user inputs the URL of that information into the URL input column 204 the browsing of which is desired by the user, the event 39 shown in FIG. 4 occurs. If there is the desired information in a Web cache, it is retrieved from the Web cache. If there is no desired information in a Web cache or when the original is newer, the information is retrieved from the server apparatus 23 on the network. At the time of retrieval of information, the display color of the symbol mark 202 is changed or the display in a simple animation form is made, thereby giving notice that the information is being retrieved.

In FIG. 13, character information is displayed in the display window. Underlined portions 207, 208, 209, 210 and 211 of the character information are called anchors. The anchor is a portion associated with other information and the association is designated by a URL. When the user designates an anchor, the designation exerts the same action as that in the case where a URL designating the association is inputted into the URL input column 204. As a result, information of that URL is retrieved and displayed. Such association of information by an anchor is called hyperlink, and the change-over of information by the designation of an anchor is called jumping. As the tendency of a method for the browsing of information, the jumping based on the hyperlink is mainly used as compared with a method in which a URL is directly inputted into the URL input column 204.

A method for issuance of a pre-read request by the browser program 4 will be described with the display window of FIG. 13 taken as an example. In the display window shown in FIG. 13, the anchors 207, 208 and 209 are being displayed presently. The anchors 210 and 211 exists in a hidden area which is not displayed unless the scrolling is made. In this case, it is predicted that there is a high possibility that the user next designates any one of the anchors 207, 208 and 209 being displayed presently. And, the order of preference is applied, for example, in sequence of the arrangement from the top. Namely, the order of preference is determined as being high in the sequence of the anchors 207, 208 and 209. Even if there is no designation from the user, a pre-read request is issued with the designation made in sequence from an anchor having the highest order of preference. The pre-read request is made designating a URL of the destination of hyperlink of an anchor made the object of pre-reading. Thereby, the event 40 shown in FIG. 4 occurs. Through a pre-read processing, information at the destination of hyperlink is retrieved from the server apparatus 23 on the network into the Web cache. In the case where the anchor made the object of pre-reading is designated by the user later on, it becomes possible to eliminate the information retrieval processing and it is therefore possible to shorten a delay time from the designation to the start of browsing.

Under the pre-read processing, the display attribute of an anchor being made the object of pre-reading may be changed. Further, the display attribute of an anchor completed for pre-read processing may also be changed. These give hints on the user's operation. Also, it is general that the display attribute of an anchor having already been browsed is changed. For example, the sorting in color is made in such a manner that an anchor having not yet been browsed is displayed with a blue color, an anchor having already been browsed is displayed with a violet color, an anchor under pre-read processing is displayed with an orange color and an anchor completed for pre-read processing is displayed with a green color.

Figure 14:
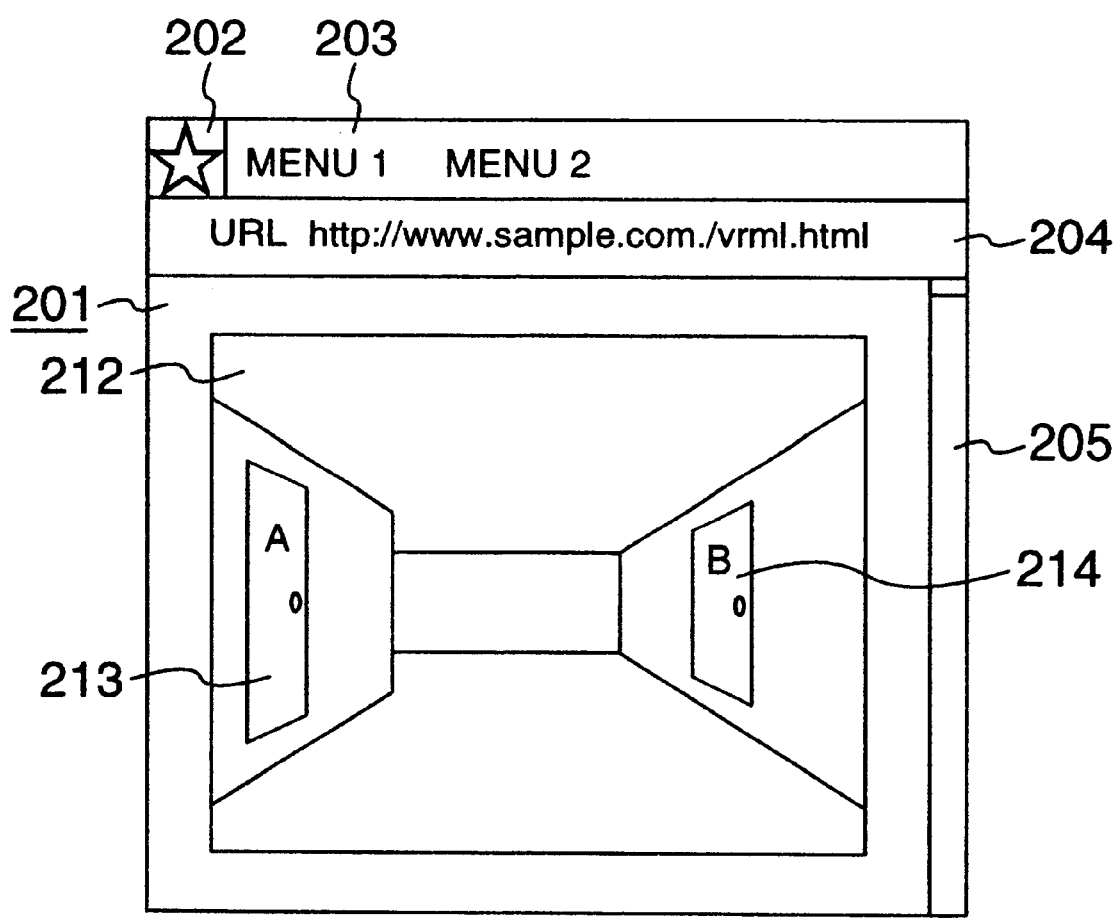
FIG. 14 is a diagram illustrating a display window of a browser program and a pre-read processing.

Next, the state of issuance of a pre-read request will be described in reference to FIG. 14 by use of an example in which three-dimensional graphics are displayed in the browsing window 201. In accordance with information to be browsed, such three-dimensional graphics as described herein may be displayed. Further, there may be the case where it is possible to perform the browsing as if there wandered in the three-dimensional graphics. In the shown example, a picture representing a corridor is displayed in a three-dimensional graphics area 212. Doors A 213 and B 214 are displayed on the left and right sides of the corridor wall, respectively. The door is hyperlinked so that when the door is designated, the jumping to a URL associated therewith is possible. In actual, when a turn to the left at the end of the corridor is taken, there is a door C at the innermost end (though it is not shown). In the case of such scene setting, the doors A 213 and B 214 are made the object of pre-reading. And, the door A has a higher order of preference since it is nearer to the user's point of sight than the door B. Even in the case where information is thus displayed in a form of three-dimensional graphics and hyperlinks are buried therein, the orders of preference for pre-reading are applied and pre-read requests are issued in sequence.

Description will be made of the case where in FIG. 13 or 14 a user clearly designates, under pre-read processing, an anchor or a portion in which a hyperlink is buried. In the case where the hyperlink designated by the user is under pre-read processing, this processing is continued and the condition judgement in step 48 shown in FIG. 4 is made as being not a pre-read processing. In the case where the hyperlink designated by the user is not under pre-read processing, that pre-read processing is interrupted. In the case of interruption, information in the midst of storage into a Web cache is revoked.

A disk ejection processing for removing the disk 37 from the DVD-RAM drive 33 will be described using FIGS. 15, 16, 17 and 18. As referred to in conjunction with FIGS. 4 and 5, a processing for writing into the disk becomes necessary when the disk 37 is ejected. When an eject button of the DVD-RAM drive 33 is depressed by a user, it is necessary to make a control so that the disk is ejected after the write processing is completed.

Figure 15:
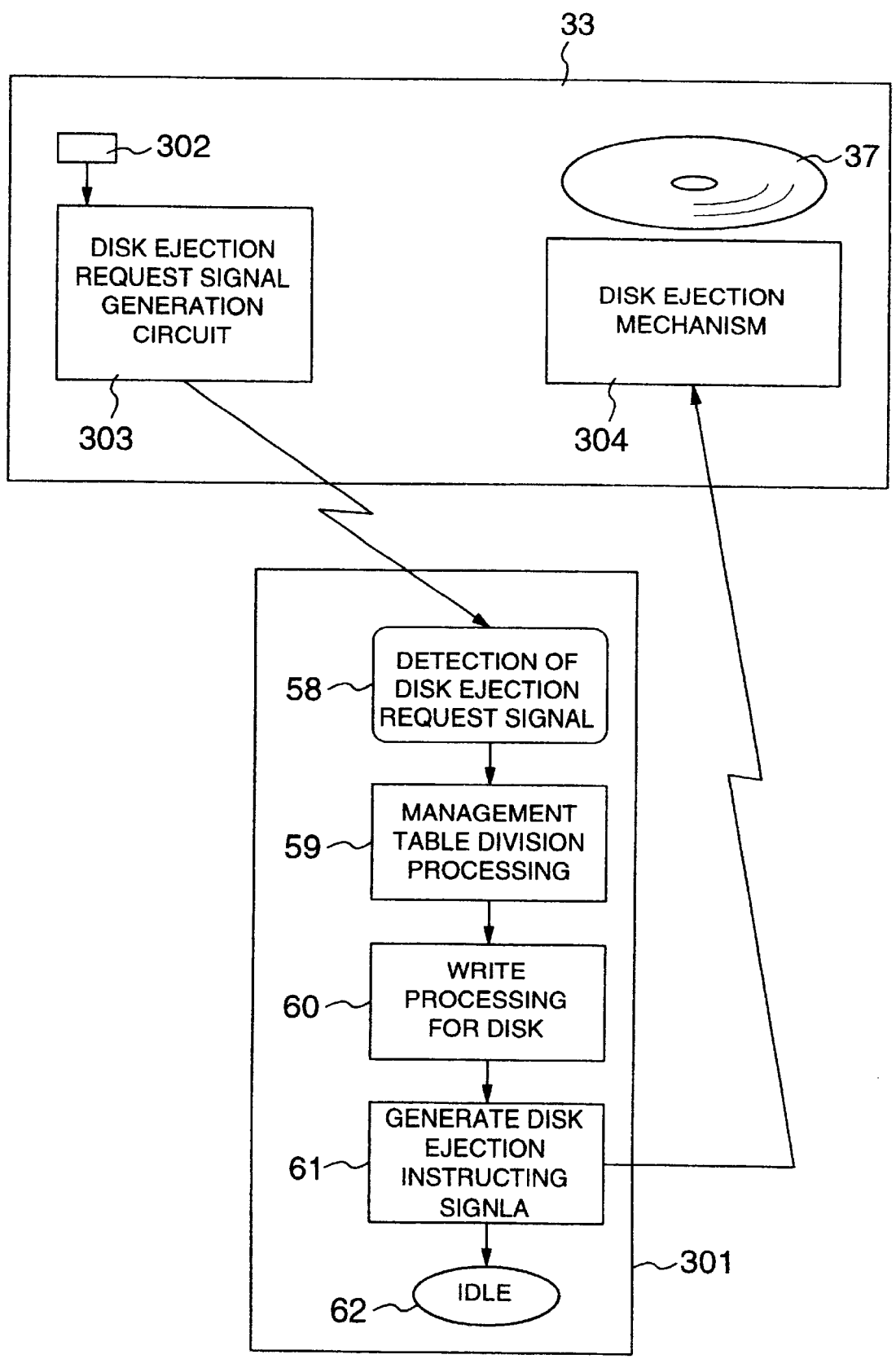
FIG. 15 is a diagram illustrating a procedure for disk ejection.

A processing for ejection of the disk 37 will be described by use of FIG. 15. A DVD-RAM drive 33 has a disk 37 mounted thereto and is provided with an eject button 302 capable of being operated by the user, a disk ejection request signal generation circuit 303 and a disk ejection mechanism 304. The disk ejection mechanism 304 is a mechanism for making it possible for the user to remove the mounted disk 37 from the DVD-RAM drive 33. FIG. 15 also shows a disk ejection processing routine 301 described in conjunction with FIG. 4. The routine 301 is a part of the Web cache program 5.

When a user operates the eject button 302, the disk ejection request signal generation circuit 303 operates to issue a disk ejection request signal to the Web cache program 5. When the Web cache program 5 detects this signal, an event 58 occurs so that the disk ejection processing routine 301 starts. In step 59, necessary entries are extracted from the Web cache management table 15 to generate a table to be written into the disk 37. In step 60, the generated table, a file to be copied from the Web cache area 22 of the HDD for write-back system, and the present instant of time are written into the disk 37. After all the write processing operations are completed, a disk ejection instructing signal is issued in step 61 and the flow is completed at step 62. The disk ejection instructing signal issued in step 61 is supplied to the disk ejection mechanism 304 so that the disk 37 is ejected.

It is preferable that there is means for forcibly ejecting the disk 37 in the case where the system falls into an abnormal condition. Though not shown, a switch may be provided for a purpose of supplying the ejection request signal directly to the disk ejection mechanism. It is preferable to make a contrivance so that the switch cannot be depressed simply by the user's finger tip or the like. It may be considered means with which the switch is protected by a cover awkward to remove or can be operated by only the end of a pin.

Figure 16:
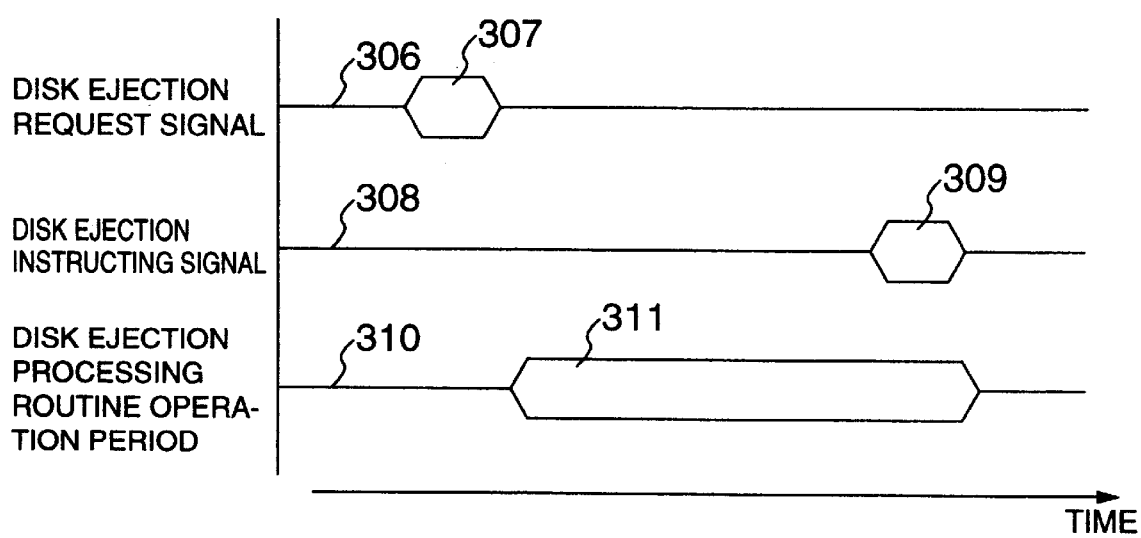
FIG. 16 is a time chart concerning a disk ejection processing.

FIG. 16 is a time chart of an important portion of the processing described in conjunction with FIG. 15. As the disk ejection processing time chart 305 are illustrated a time chart 306 of a disk ejection request signal, a time chart 308 of a disk ejection instructing signal and a time chart 310 of a disk ejection processing routine operation period. A portion denoted by reference numeral 307 indicates an assert period of the disk ejection request signal. The assert period is a period when a signal level corresponding to a logical value of 1. A portion denoted by reference numeral 309 indicates an assert period of the disk ejection instructing signal. A portion denoted by reference numeral 311 indicates the disk ejection processing routine operation period.

Assume that the eject button 302 is operated so that a disk ejection request signal is issued from the disk ejection request signal generation circuit 303 at a timing indicated by reference numeral 307. The disk ejection processing routine receiving the disk ejection request signal operates in a period indicated by reference numeral 311. A disk ejection instructing signal is issued at a timing indicated by reference numeral 309 so that the disk ejection mechanism 304 operates.

Figure 17:
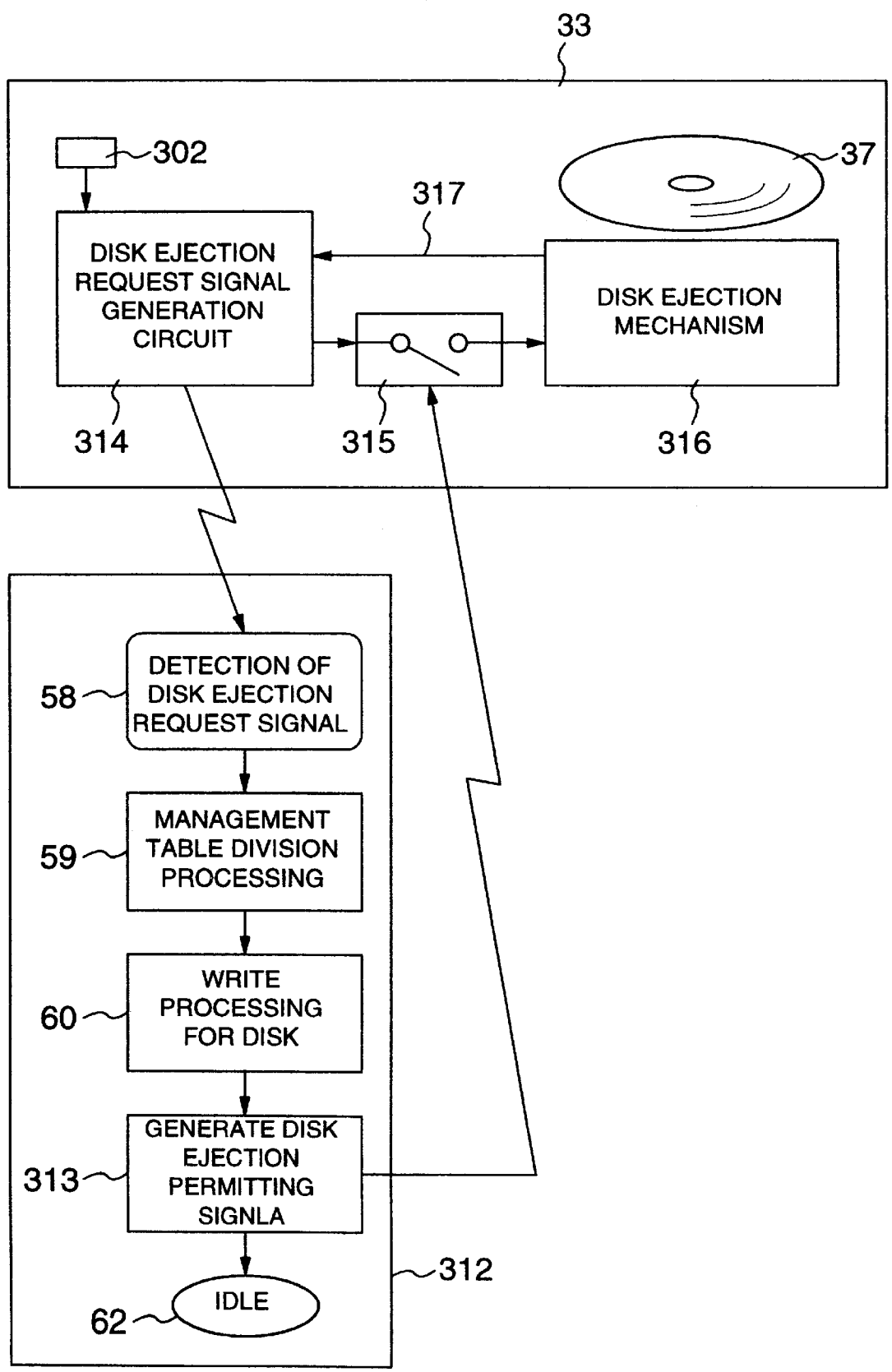
FIG. 17 is a diagram illustrating a procedure for disk ejection.

Another realizing system of the processing for ejection of the disk 37 will be described using FIG. 17. A DVD-RAM drive 33 has a disk 37 mounted thereto. The DVD-RAM drive 33 is provided with an eject button 302, a disk ejection request signal generation circuit 314, a disk ejection inhibition circuit 315 and a disk ejection mechanism 316. A path of an ejection request reset signal is denoted by reference numeral 317. In function, the disk ejection inhibition circuit 315 is a switch which makes the permission/inhibition of the transmission of a disk ejection request signal from the disk ejection request signal generation circuit 314 to the disk ejection mechanism 316. Under Web cache program operation, the disk ejection inhibition circuit 315 takes a stationarily opened condition so that it does not transmit the disk ejection request signal from the disk ejection request signal generation circuit 314. Similarly to the disk ejection mechanism 304 shown in FIG. 15, the disk ejection mechanism 316 is a mechanism for ejecting the disk. In addition, the disk ejection mechanism 316 issues an ejection request reset signal to the disk ejection request signal generation circuit 314 at the time of disk ejection. FIG. 17 also shows a disk ejection processing routine 312. This routine is almost the same as the disk ejection processing routine 301 described in conjunction with FIG. 15. A difference of the disk ejection processing routine 312 from the disk ejection processing routine 301 lies in that step 313 is substituted for step 61 of the routine 301 and a signal to be issued means not the instruction for disk ejection but the permission of disk ejection.

When a user operates the eject button 302, the disk ejection request signal generation circuit 314 operates to output a disk ejection request signal to the disk ejection mechanism 316 through the disk ejection inhibition circuit 315. The disk ejection inhibition circuit 315 takes an opened condition under operation of the Web cache program 5 so that the outputted disk ejection request signal does not reach the disk ejection mechanism 316. On the other hand, when the Web cache program 5 detects the generation of the disk ejection request signal, an event 58 occurs so that the disk ejection processing routine 312 starts. In step 59, necessary entries are extracted from the Web cache management table 15 to generate a table to be written into the disk 37. In step 60, the generated table, a file to be copied from the Web cache area 22 of the HDD for write-back system, and the present instant of time are written into the disk 37. After all the write processing operations are completed, a disk ejection permitting signal is issued in step 313 and the flow is completed at step 62. The disk ejection permitting signal issued in step 313 is supplied to the disk ejection inhibition circuit 315 to bring the circuit 315 into a closed condition. Thereby, the disk ejection request signal from the disk ejection request signal generation circuit 314 is transmitted and is supplied to the disk ejection mechanism 316. When this signal is received, the disk ejection mechanism 316 operates. At this time, an ejection request reset signal is supplied to the disk ejection request signal generation circuit 314, as indicated by reference numeral 317, to reset the disk ejection request signal.

FIG. 18 is a time chart of an important portion of the processing described in conjunction with FIG. 17. As the disk ejection processing time chart 318 are illustrated a time chart 319 of the condition of the disk ejection inhibition circuit, a time chart 320 of a Web cache program operation period, a time chart 322 of a disk ejection request signal, a time chart 324 of a disk ejection permitting signal, a time chart 326 of an ejection instruction to the disk ejection mechanism, a time chart 328 of an ejection request reset signal and a time chart 330 of a disk ejection processing routine operation period. A portion denoted by reference numeral 321 indicates the Web cache program operation period. A portion denoted by reference numeral 323 indicates an assert period of the disk ejection request signal. A portion denoted by reference numeral 325 indicates an assert period of the disk ejection permitting signal. In a portion denoted by reference numeral 327, the ejection instruction to the disk ejection mechanism is given. A portion denoted by reference numeral 329 indicates an assert period of the ejection request reset signal. A portion denoted by reference numeral 331 indicates the disk ejection processing routine operation period.

It is assumed that in a period indicated by reference numeral 321, the Web cache program 5 is operating. In this period, the disk ejection inhibition circuit 315 takes an opened condition, as indicated by reference numeral 319, so that the transfer from the disk ejection request signal generation circuit 314 is inhibited. When a user operates the eject button 302, the disk ejection request signal generation circuit operates to output a disk ejection request signal in a period indicated by reference numeral 323. When the Web cache program 5 detects the disk ejection request signal, the disk ejection processing routine 312 operates in a period indicated by reference numeral 331. In step 313 in the routine 312, a disk ejection permitting signal is issued at a timing indicated by reference numeral 325. This signal is supplied to the disk ejection inhibition circuit 315 which is in turn brought into a closed condition only in a period when the disk ejection permitting signal is asserted. Thereby, the disk ejection request signal is transmitted through the disk ejection inhibition circuit 315 and is then outputted as the ejection instruction to the disk ejection mechanism in a period indicated by reference numeral 327. Receiving this signal, the disk ejection mechanism 316 operates so that the disk is ejected. At the same time, an ejection request reset signal is outputted at a timing indicated by reference numeral 329. When the election request reset signal is received, the disk ejection request signal is withdrawn so that the period indicated by reference numeral 323 is completed.

In the foregoing, the embodiment of the present invention has been described using FIGS. 1 to 18. In the browser apparatus of the present embodiment, a Web cache is also constituted in a DVD-RAM disk. If a user carries this DVD-RAM disk, the browsing becomes immediately possible, when the user uses another browser apparatus, without making access to a network since the Web cache of the DVD-RAM disk is stored with information which the user has browsed recently or browses frequently. Thereby, for example, even in the case where a user performing a browsing work customarily by use of a browser apparatus connected to a high-speed LAN temporarily uses a browser apparatus connected through a telephone line, there is an effect that the productivity of a browsing work can be maintained in regard to information which the user has browsed recently or browses frequently. As a specific example of this case, there may be considered the case where a salesman having browsed a selling catalogue at an office goes to the place of a customer to show the selling catalogue to the customer. There is another effect that if a disk having information provided on a network and recorded beforehand in the form of a Web cache is acquired, this information is added into a Web cache and hence the browsing is possible with no change of a browsing method in which a URL is designated. Moreover, since it is not required that the body of information to be browsed should not be acquired from the network at that time, a comfortable browsing work can be performed even if the network environment is poor.

In the present embodiment, information at a designation of hyperlink having a high possibility of browsing is retrieved into a Web in advance before there is an indication from a user. This means that the acquisition of information at a designation of hyperlink having a high possibility of browsing is started during a time when the user is browsing the present display window. Thereby, it is possible to enhance a possibility that information at a designation of hyperlink indicated by the user is stored in the Web cache. As a result, it is possible to shorten the mean value of a delay time from the user's indication to the display of information.

In the present embodiment, though a Web cache is constituted in a DVD-RAM disk, a write-processing for the DVD-RAM disk is required at the time of disk removal in order to hold the consistency of the contents of the disk. According to the present embodiment, even in the case where a user tries to remove the disk by use of an eject button of a DVD-RAM drive, it is possible to prevent the ejection of the disk until the required write-processing is completed. Accordingly, it is possible to prevent the destruction of the contents of the disk which may be caused by the result in incompletion of the ultimate write-processing.

As apparent from the foregoing description, the constitution of a Web cache in a removable storage medium makes it possible for a user to carry a Web cache following the history of user's browsing. For information which has once been browsed by the user and the original of which is thereafter subjected to no updating, it becomes possible to cover a delay time for information acquisition even if another browser apparatus is used. Even in the case where a browser apparatus at the destination of movement of the user while carrying the Web cache is connected to a network by a low-speed line such as a telephone line or is not connected to the network, the browsing of information is immediately possible if the information is one included in the Web cache in the storage medium.

Also, if information provided by an information provider on a network is stored in a storage medium in the form of a Web cache and the storage medium is delivered to a browser, it becomes possible for the browser to browse the information without acquiring the information through the network.

By pre-reading information at the destination of an anchor being displayed in a browsing window or a displayed object similar thereto to store in a Web cache, it is possible to cover a delay time for acquisition of information at the destination of hyperlink. Also, a user can be informed of the state of progression of pre-reading in such a manner that the display attribute of an anchor for which the pre-reading of information at the destination of hyperlink has been completed and the display attribute for which the pre-reading is being performed are made different from those of other texts or anchors.

When the removal of a removable storage medium having a Web cache constituted therein is tried by a user by use of an eject button, a necessary processing is certainly performed by a program on the system side and an instruction for ejection or the permission of ejection is thereafter issued from the system side, thereby making it possible to prevent the storage medium from being removed in a state in which a write-processing for the Web cache is not completed.

By writing, at the time of removal of the storage medium, a time (inclusive of a date) at that point of time and a time difference between that time and a specified time zone (for example, a Greenwich mean time) into the storage medium, it is possible to simplify a processing concerning the check date/time of the Web cache and/or correcting a time difference in check date/time.

Also, by providing a recording medium (DVD-RAM) freely detachable from a terminal apparatus (or browser apparatus) with a portion recorded with a program executed by the terminal equipment and a portion recorded with information as cache data from the network to which the terminal equipment is connected, such an Internet accessing environment as shown by the present embodiment (or a program itself for performing the present processing and a storage area used as a cache) can be provided by one recording medium. Namely, by carrying the recording medium to another computer to cause the program to be executed on the other computer, the network accessing environment shown by the present invention can be realized on the other computer.

More particularly, the above-mentioned portion recorded with the program is recorded with a browser program shown by the present embodiment. The portion recorded with information as cache data from the network is a Web cache area shown by the present embodiment. In addition, a Web cache management table area is provided on a DVD-RAM.

Industrial Applicability

As having been described in the above, a browser apparatus according to the present invention can be used as a client system such as a browser apparatus, a personal computer or the like which receives a World Wide Web (WWW) service. It is particularly useful for the shortening of a time up to display or the like and the improvement of a user interface by displaying the copy at the time of second and subsequent accesses. Also, a recording medium according to the present invention is useful as a medium which supplies the above-mentioned function to the browser apparatus or the client system in the form of software and provides a cache for reducing a load imposed upon a network.

What is claimed is:

1. A terminal apparatus comprising:
   a storage medium for storing information from a network as cache data, said storage medium being made freely detachable; and
   means for recording said information as cache data into a secondary memory device other than said storage medium,
   wherein:
   a first directory table is provided for associating an address of said in formation on said network and an address of said information on said storage medium stored as the cache data in said storage medium is provided in said storage medium,
   a second directory table is provided for associating an address of said information on said network and an address of said information on said secondary memory device stored as the cache data in said secondary memory device is provided in said secondary memory device, and
   means is provided for making the search of cache data by use of a third directory which is generated by merging said first directory table and said second directory table with the address of said information on said network used a key and is provided with a field for the address on said storage medium and a field for the address on said secondary memory device.

2. A terminal apparatus according to claim 1, wherein means is provided for examining whether or not said first directory table exists in said storage medium at the time of mounting of said storage medium.

3. A terminal apparatus according to claim 2, wherein means is provided for examining whether or not said first directory table exists in said storage medium at the time of mounting of said storage medium and merging, in the case where said first directory table exists, said first directory table into said third directory table with the address of said information on said network used as a key.

4. A terminal apparatus according to claim 1, wherein means is provided with which at the time of removal of said storage medium, an entry inputted with the address of said information on said storage medium stored as the cache data in said storage medium is extracted in said third directory table, said first directory table is updated by information of the extracted entry, and the field for the address of the extracted entry on said storage medium is cleared.

5. A terminal apparatus comprising:
    a storage medium for storing information from a network as cache data, said storage medium is made free detachable and usable in another terminal apparatus;
    means for recording said information as cache data into a secondary memory device other than said storage medium,
    wherein:
        a first directory table for associating an address of said information on said network and an address of said information on said storage medium stored as the cache data in said storage medium is provided in said storage medium,
        a second directory table for associating an address of said information on said network and an address of said information on said secondary memory device stored as the cache data in said secondary memory device is provided in said secondary memory device, and
        means is provided for making the search of cache data by use of a third directory which is generated by merging said first directory table and said second directory table with the address of said information on said network using a key and is provided with a field for the address on said storage medium and a field for the address on said secondary memory device.

6. A terminal apparatus according to claim 5, wherein means is provided for examining whether or not said first directory table exists in said storage medium at the time of mounting of said storage medium.

7. A terminal apparatus according to claim 6, wherein means is provided for examining whether or not said first directory table exists in said storage medium at the time of mounting of said storage medium and merging, in the case where said first directory table exists, said first directory table into said third directory table with the address of said information on said network used as a key.

8. A terminal apparatus according to claim 5, wherein means is provided with which at the time of removal of said storage medium, an entry inputted with the address of said information on said storage medium stored as the cache data in said storage medium is extracted in said third directory table, said first directory table is updated by information of the extracted entry, and the field for the address of the extracted entry on said storage medium is cleared.

9. A method for information access from a terminal apparatus used in a manner connected to a network, comprising:

a step of referring from a storage medium to a first directory table concerning data on said storage medium, said storage medium being freely detachable from said terminal apparatus and having a copy of information from a network written as data therein;

a step of referring to a second directory table concerning data on a secondary memory device in said terminal apparatus, said secondary memory device having a copy of information from said network written as data therein;

a step of making access to either said storage medium or said secondary memory device by use of both the result of said step of referring to said first directory table and the result of said step of referring to said second directory table; and a step of acquiring said information through said network in the case where said both results indicate that there is said information in neither said storage medium nor said secondary memory device, wherein when said storage medium is mounted to said terminal apparatus, said step of referring to said first directory table is carried out.

10. A control method in a system in which the combination of a memory device including a removable storage medium stored with information and another secondary memory device is used as a cache storage for storing a copy of information acquired through a network and said cache storage is controlled in such a manner that it is also held in said storage medium, wherein when the indication of ejection of said storage medium is given from a user to said memory device, a write processing for said storage medium is performed in the case where information to be recorded in said storage medium exists in said cache storage, and an instruction for ejection of said storage medium is given from said system to said memory device after said write processing is completed, wherein when said write processing is performed, information concerning date and time and information concerning a time difference between said time and a specified time zone are recorded into said storage medium.

11. A control method in a system in which the combination of a memory device including a removable storage medium stored with information and another secondary memory device is used as a cache storage for storing a copy of information acquired through a network and said cache storage is controlled in such a manner that it is also held in said storage medium, wherein when the indication of ejection of said storage medium is given from a user to said memory device, a write processing for said storage medium is performed in the case where information to be recorded in said storage medium exists in said cache storage, and the permission of ejection of said storage medium is given from said system to said memory device after said write processing is completed, wherein when said write processing is performed, information concerning date and time and information concerning a time difference between said time and a specified time zone are recorded into said storage medium.

* * * * *